(12) United States Patent
Nitta et al.

(10) Patent No.: US 8,965,397 B2
(45) Date of Patent: Feb. 24, 2015

(54) COMMUNICATION APPARATUS, METHOD FOR COMMUNICATION, WIRELESS COMMUNICATION SYSTEM, WIRELESS BASE STATION, AND MOBILE USER TERMINAL

(75) Inventors: Daisuke Nitta, Kawasaki (JP); Hiromitsu Kawai, Yokohama (JP); Kazunari Kobayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 13/428,426

(22) Filed: Mar. 23, 2012

(65) Prior Publication Data

US 2012/0302253 A1    Nov. 29, 2012

(30) Foreign Application Priority Data

May 25, 2011    (JP) ................................. 2011-117269

(51) Int. Cl.
*H04W 4/02*    (2009.01)
(52) U.S. Cl.
CPC .................................... *H04W 4/021* (2013.01)
USPC .................. 455/456.1; 455/456.2; 455/435.2; 455/432.3; 370/328; 370/329; 370/331; 370/338
(58) Field of Classification Search
CPC ........ H04W 4/02; H04W 68/00; H04W 48/10
USPC ............. 455/456.1, 456.2, 420, 435.2, 432.3; 370/328, 329, 331, 338
See application file for complete search history.

(56) References Cited

U.S. PATENT DOCUMENTS

| 7,907,597 | B2  |   | 3/2011 | Lee et al. |
|-----------|-----|---|--------|----------|
| 8,185,103 | B2  | * | 5/2012 | Alfano et al. ............... 455/432.3 |
| 2009/0088183 | A1 | * | 4/2009 | Piersol et al. ............... 455/456.1 |
| 2010/0054185 | A1 |   | 3/2010 | Kaneko et al. |
| 2011/0144905 | A1 | * | 6/2011 | Tahara .......................... 701/201 |

FOREIGN PATENT DOCUMENTS

| JP | 2004-328593 | 11/2004 |
|----|-------------|---------|
| JP | 2007-503756 | 2/2007  |
| JP | 2010-062783 | 3/2010  |
| JP | 2011-045144 | 3/2011  |

OTHER PUBLICATIONS

3GPP TS 25.331 V8.6.0-8.5.23 Measured results on RACH, pp. 321 to 323 (2009).
3GPP TS 36.331 V8.6.0-6.3.5 Measurement information elements, Measured Results, pp. 155 to 157 (2009).
(Continued)

*Primary Examiner* — Kashif Siddiqui
*Assistant Examiner* — Farideh Madani
(74) *Attorney, Agent, or Firm* — Fujitsu Patent Center

(57) ABSTRACT

The communication apparatus includes an IF that receives positioning information of a mobile user terminal from the mobile user terminal which is able to communicate by using at least one wireless communication scheme; and a controller that detects one or more communicable areas that allow communication by using the at least one wireless communication scheme, by determining which area includes a position indicated by the positioning information among a plurality of areas.

13 Claims, 31 Drawing Sheets

(56) References Cited

OTHER PUBLICATIONS

3GPP TS 36.355 V9.4.0-6.4.1 Common Lower-Level IEs, Ellipsoid Point With Altitude, p. 31 (2010).—6.5.3.2 E CID Location Information Elements, pp. 109 to 110 (2010).

JPOA—Office Action mailed on Aug. 26, 2014 for Japanese Application No. 2011-117269 with partial English translation.

* cited by examiner

FIG. 3

| MAJOR CLASSIFICATION | INTERMEDIATE CLASSIFICATION | NAME | EXAMPLE VALUE (UNIT) | DESCRIPTION |
|---|---|---|---|---|
| USER ID | | IMSI | 001 | ID TO SPECIFY USER |
| MEASUREMENT TIME | MEASUREMENT TIME | date | 2011/01/19 01:00:00 | TIME OF RECEPTION OF MEASUREMENT INFO. |
| POSITIONING INFO. | LATITUDE/ LONGITUDE/ ALTITUDE | latitudeSign | north | NORTH/SOUTH LATITUDE |
| | | latitude | 35 DEG. 39 MIN. 30.992 SEC. | LATITUDE |
| | | longitude | 139 DEG. 44 MIN. 43.609 SEC. | LONGITUDE |
| | | altitudeDirection | height | HIGHT/DEPTH |
| | | altitude | 10(m) | ALTITUDE |
| LTE CELL INFO. #1 | CELL INFO. | physCellId | 001 | ID TO SPECIFY CELL |
| | WIRELESS QUALITY | rsrq-Result | -12.0(dB) | DEGREE OF INTERFERENCE |
| | | rsrp-Result | -90(dBm) | RECEPTION INTENSITY |
| LTE CELL INFO. #2 | | | ... | |
| ... | | | ... | |
| LTE CELL INFO. #m | | | | |
| 3G CELL INFO. #1 | CELL INFO. | Cell Identity | 001 | ID TO SPECIFY CELL |
| | WIRELESS QUALITY | CPICH Ec/N0 | -12.0(dB) | DEGREE OF INTERFERENCE |
| | | CPICH RSCP | -90(dBm) | RECEPTION INTENSITY |
| 3G CELL INFO. #2 | | | ... | |
| ... | | | ... | |
| 3G CELL INFO. #m | | | | |
| TERMINAL TYPE INFO. | TERMINAL TYPE INFO. | IMEI-SV | 001 | ID TO SPECIFY TERMINAL TYPE |

WIRELESS QUALITY INFORMATION (braces LTE CELL INFO. #1 through 3G CELL INFO. #m)

FIG. 4

| MAJOR CLASSIFICATION | INTERMEDIATE CLASSIFICATION | NAME | EXAMPLE VALUE (UNIT) | DESCRIPTION |
|---|---|---|---|---|
| USER ID | USER ID | IMSI | 001 | ID TO SPECIFY USER |
| MEASUREMENT TIME | MEASUREMENT TIME | date | 2011/01/19 01:00:00 | TIME OF RECEPTION OF MEASUREMENT INFO. |
| POSITIONING INFO. | LATITUDE/ LONGITUDE/ ALTITUDE | latitudeSign | north | NORTH/SOUTH LATITUDE |
| | | latitude | 35 DEG. 39 MIN. 30.992 SEC. | LATITUDE |
| | | longitude | 139 DEG. 44 MIN. 43.609 SEC. | LONGITUDE |
| | | altitudeDirection | height | HIGHT/DEPTH |
| | | altitude | 10(m) | ALTITUDE |
| 3G CELL INFO. #1 | CELL INFO. | Cell Identity | 001 | ID TO SPECIFY CELL |
| | WIRELESS QUALITY | CPICH Ec/N0 | −12.0(dB) | DEGREE OF INTERFERENCE |
| | | CPICH RSCP | −90(dBm) | RECEPTION INTENSITY |
| 3G CELL INFO. #2 | | | ... | ... |
| 3G CELL INFO. #n | | | ... | ... |
| TERMINAL TYPE INFO. | TERMINAL TYPE INFO. | IMEI-SV | 001 | ID TO SPECIFY TERMINAL TYPE |

WIRELESS QUALITY INFORMATION: 3G CELL INFO. #1 – 3G CELL INFO. #n

FIG. 6

|  | LONGITUDE 139 DEG. 44 MIN. 43.600 SEC. | LONGITUDE 139 DEG. 44 MIN. 43.601 SEC. | LONGITUDE 139 DEG. 44 MIN. 43.602 SEC. | LONGITUDE 139 DEG. 44 MIN. 43.603 SEC. | LONGITUDE 139 DEG. 44 MIN. 43.604 SEC. | LONGITUDE 139 DEG. 44 MIN. 43.605 SEC. |
|---|---|---|---|---|---|---|
| LATITUDE 35 DEG. 39 MIN. 30.900 SEC. | | | | | | |
| | a1 | b1 | c1 | d1 | e1 | |
| LATITUDE 35 DEG. 39 MIN. 30.901 SEC. | | | | | | |
| | a2 | b2 | c2 | d2 | e2 | |
| LATITUDE 35 DEG. 39 MIN. 30.902 SEC. | | | | | | |
| | a3 | b3 | c3 | d3 | e3 | |
| LATITUDE 35 DEG. 39 MIN. 30.903 SEC. | | | | | | |
| | a4 | b4 | c4 | d4 | e4 | |
| LATITUDE 35 DEG. 39 MIN. 30.904 SEC. | | | | | | |
| | a5 | b5 | c5 | d5 | e5 | |
| LATITUDE 35 DEG. 39 MIN. 30.905 SEC. | | | | | | |

FIG. 7

| AREA ID | USER ID | MEASUREMENT TIME | LTE CELL INFO. #1 | | | ... | 3G CELL INFO. #1 | | | ... | TERMINAL TYPE | THE NUMBER OF TIMES OF RECORDING | |
|---|---|---|---|---|---|---|---|---|---|---|---|---|---|
| | | | physCellId | rsrq-Result | rsrp-Result | | Cell Identity | CPICH Ec/N0 | CPICH RSCP | | | LTE | 3G |
| a1 | 001 | 2011/01/19 01:00:00 | 001 | −12.0(dB) | −90(dBm) | ... | 001 | −12.0(dB) | −90(dBm) | ... | 3G/LTE DUAL TERMINAL | 7 | 0 |
| | 002 | 2011/12/19 01:00:00 | | | | ... | 001 | −12.0(dB) | −90(dBm) | ... | 3G TERMINAL | 0 | 1 |
| | 003 | 2010/12/19 01:00:00 | | | | ... | 001 | −12.0(dB) | −90(dBm) | ... | 3G/LTE DUAL TERMINAL | 0 | 1 |
| d5 | 001 | 2011/01/19 01:00:00 | 001 | −12.0(dB) | −90(dBm) | ... | 001 | −12.0(dB) | −90(dBm) | ... | 3G/LTE DUAL TERMINAL | 3 | 0 |
| | 002 | 2011/01/19 01:00:00 | | | | ... | 001 | −12.0(dB) | −90(dBm) | ... | 3G TERMINAL | 0 | 3 |
| | 003 | 2011/01/25 01:00:00 | | | | ... | 001 | −12.0(dB) | −90(dBm) | ... | 3G/LTE DUAL TERMINAL | 3 | 1 |

FIG. 8

| NAME | EXAMPLE VALUE (UNIT) | DESCRIPTION |
|---|---|---|
| USER ID TO BE NOTIFIED | 003 | ID TO SPECIFY USER TO BE NOTIFIED |
| ANALYSIS INTERVAL | ON OCCASION | INTERVALS OF ANALYSIS (REGULARLY OR OCCASIONALLY) |

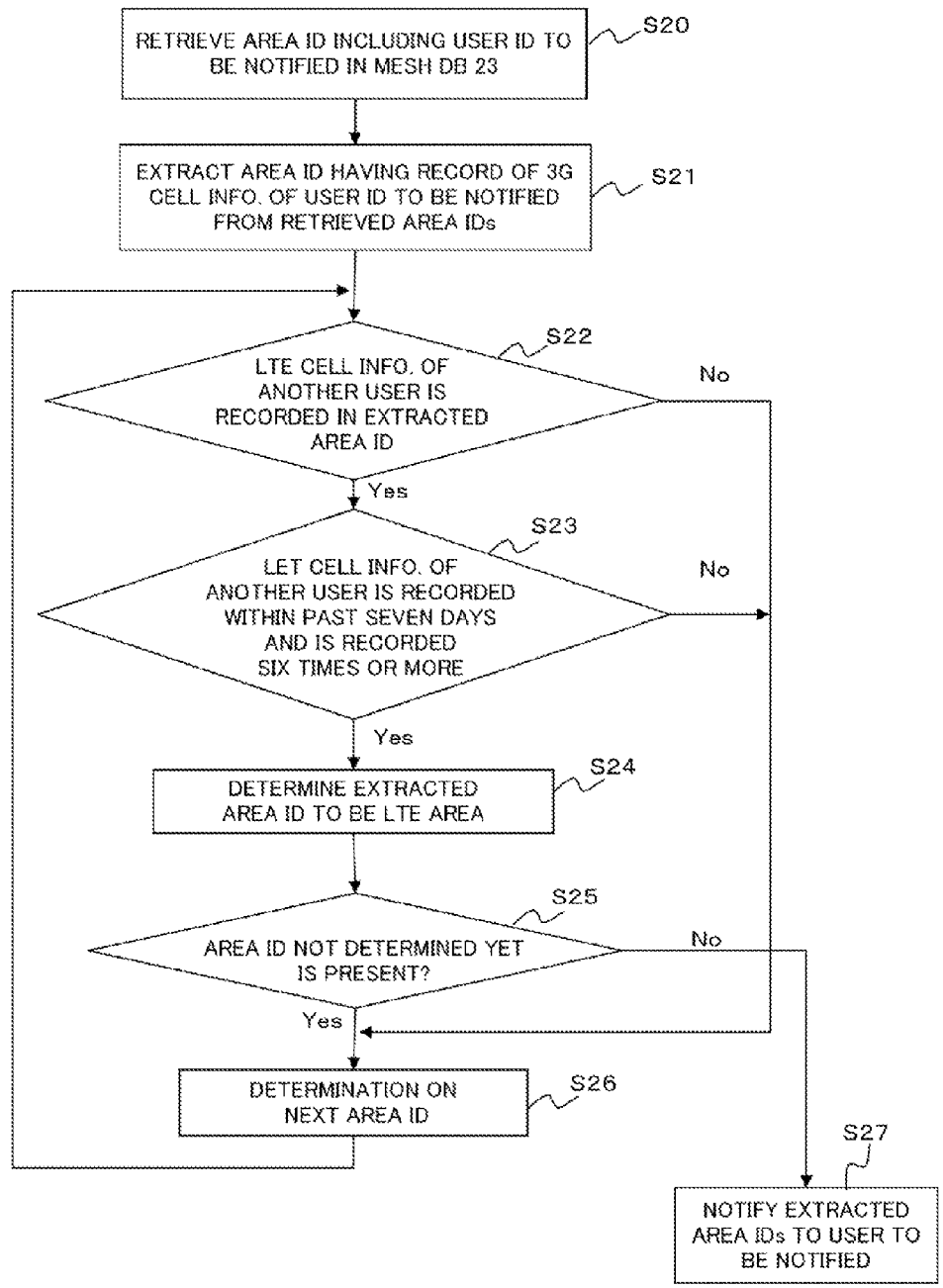

FIG. 10

| AREA ID | USER ID | MEASUREMENT TIME | LTE CELL INFO. #1 ||| ... | 3G CELL INFO. #1 |||| ... | TERMINAL TYPE | THE NUMBER OF TIMES OF RECORDING ||
|---|---|---|---|---|---|---|---|---|---|---|---|---|---|---|
| | | | physCellId | rsrq-Result | rsrp-Result | | Cell Identity | OPICH Ec/N0 | OPICH RSCP | | | | LTE | 3G |
| a1 | 001 | 2011/01/19 01:00:00 | 001 | -12.0(dB) | -90(dBm) | ... | 001 | -12.0(dB) | -90(dBm) | ... | 3G/LTE DUAL TERMINAL | 7 | 0 |
| | 002 | 2011/01/19 01:00:00 | | | | ... | 001 | -12.0(dB) | -90(dBm) | ... | 3G TERMINAL | 0 | 1 |
| | 003 | 2010/12/19 01:00:00 | | | | ... | 001 | -12.0(dB) | -90(dBm) | ... | 3G/LTE DUAL TERMINAL | 0 | 1 |
| d4 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 004 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 003 | 2011/01/25 01:00:00 | 001 | -12.0(dB) | | ... | 001 | -12.0(dB) | -90(dBm) | ... | 3G/LTE DUAL TERMINAL | 0 | 6 |
| | 001 | 2011/01/25 01:00:00 | 001 | -12.0(dB) | -90(dBm) | ... | 001 | -12.0(dB) | -90(dBm) | ... | 3G/LTE DUAL TERMINAL | 6 | 0 |
| d5 | 004 | 2011/01/25 01:00:00 | | | | ... | 001 | -12.0(dB) | -90(dBm) | ... | 3G/LTE DUAL TERMINAL | 6 | 1 |
| | 005 | 2011/01/19 01:00:00 | | | | ... | 001 | -12.0(dB) | -90(dBm) | ... | 3G/LTE DUAL TERMINAL | 6 | 1 |
| | 003 | 2011/01/19 01:00:00 | 001 | -12.0(dB) | -90(dBm) | ... | 001 | -12.0(dB) | -90(dBm) | ... | 3G/LTE DUAL TERMINAL | 6 | 0 |

FIG. 11

| NAME | EXAMPLE VALUE (UNIT) | DESCRIPTION |
|---|---|---|
| AREA ID DETERMINED TO BE LTE | a1, d4 | AREA ID SEEMS TO BE NEWLY PUT INTO LTE WITHIN SPHERE OF USER ID |

FIG. 13

| NAME | EXAMPLE VALUE (UNIT) | DESCRIPTION |
|---|---|---|
| AREA DETERMINED TO HAVE FAILURE | d5 | AREA ID INCLUDING LTE AREA SEEMS TO HAVE FAILURE WITHIN SPHERE OF USER ID |

FIG. 15

| NAME | EXAMPLE VALUE (UNIT) | DESCRIPTION |
|---|---|---|
| ROUTE RETRIEVAL TYPE | TRAIN | TYPE OF ROUTE (E.G. TRAIN, ROAD) |
| DEPARTURE POSITION INFORMATION | A STATION | POSITION OF DEPARTURE (E.G. STATION NAME, COORDINATES) |
| ARRIVAL POSITION INFORMATION | D STATION | POSITION OF ARRIVAL (E.G. STATION NAME, COORDINATES) |
| ANOTHER INFORMATION (E.G. INFORMATION OF PASSING POSITION) | NONE | INFORMATION OF PASSING POSITION (OPTION) |

FIG. 17

|  | LONGITUDE 139 DEG. 44 MIN. 43.600 SEC. | LONGITUDE 139 DEG. 44 MIN. 43.601 SEC. | LONGITUDE 139 DEG. 44 MIN. 43.602 SEC. | LONGITUDE 139 DEG. 44 MIN. 43.603 SEC. | LONGITUDE 139 DEG. 44 MIN. 43.604 SEC. | LONGITUDE 139 DEG. 44 MIN. 43.605 SEC. |
|---|---|---|---|---|---|---|
| LATITUDE 35 DEG. 39 MIN. 30.900 SEC. | | | | | | |
| | a1 | b1 | c1 | d1 | e1 | |
| LATITUDE 35 DEG. 39 MIN. 30.901 SEC. | | | | | | |
| | a2 | b2 [A STA.] | c2 [B STA.] | d2 | e2 | |
| LATITUDE 35 DEG. 39 MIN. 30.902 SEC. | | | | | | |
| | a3 | b3 | c3 | d3 | e3 | |
| LATITUDE 35 DEG. 39 MIN. 30.903 SEC. | | | | | | |
| | a4 | b4 [C STA.] | c4 | d4 [D STA.] | e4 | |
| LATITUDE 35 DEG. 39 MIN. 30.904 SEC. | | | | | | |
| | a5 | b5 | c5 | d5 | e5 | |
| LATITUDE 35 DEG. 39 MIN. 30.905 SEC. | | | | | | |

FIG. 18

| AREA ID | USER ID | MEASUREMENT TIME | LTE CELL INFO. #1 | | | ... | 3G CELL INFO. #1 | | | ... | TERMINAL TYPE | THE NUMBER OF TIMES OF RECORDING | |
|---|---|---|---|---|---|---|---|---|---|---|---|---|---|
| | | | physCellId | rsrq-Result | rsrp-Result | | Cell identity | CPICH Ec/N0 | CPICH RSCP | | | LTE | 3G |
| b2 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| b3 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| b4 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| c2 | 003 | 2011/01/19 01:00:00 | | | | ... | 001 | -12.0(dB) | -90(dBm) | ... | 3G TERMINAL | 0 | 3 |
| | 004 | 2011/01/19 01:00:00 | | | | ... | 001 | -12.0(dB) | -90(dBm) | ... | 3G TERMINAL | 0 | 3 |
| c3 | 003 | 2011/01/19 01:00:00 | | | | ... | 001 | -12.0(dB) | -90(dBm) | ... | 3G TERMINAL | 0 | 3 |
| | 004 | 2011/01/19 01:00:00 | | | | ... | 001 | -12.0(dB) | -90(dBm) | ... | 3G TERMINAL | 0 | 3 |
| c4 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| d4 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |

FIG. 19

| NAME | | EXAMPLE VALUE (UNIT) | DESCRIPTION |
|---|---|---|---|
| ROUTE RETRIEVAL TYPE | | TRAIN | TYPE OF ROUTE (E.G., TRAIN ROAD) |
| DEPARTURE POSITION INFORMATION | | A STATION | POSITION OF DEPARTURE (E.G. STATION NAME, COORDINATES) |
| ARRIVAL POSITION INFORMATION | | D STATION | POSITION OF ARRIVAL (E.G. STATION NAME, COORDINATES) |
| FIRST ROUTE | PASSING AREA ID | b2, b3, b4, c4, d4 | AREA ID THAT ROUTE 1 PASSES |
| | ANOTHER INFORMATION (E.G. INFO. OF POSITION THROUGH WHICH ROUTE GOES) | PASS C STATION | INFORMATION OF PASSING POSITION (OPTION) |
| | TOTAL NUMBER OF AREA IDs | 5 | TOTAL NUMBER OF AREA IDs |
| | RATIO OF LTE AREA | 100% | RATIO OF LTE AREAS ON ROUTE |
| SECOND ROUTE | PASSING AREA ID | b2, c2, c3, d4 | AREA ID THAT ROUTE 2 PASSES |
| | ANOTHER INFORMATION (E.G. INFO. OF POSITION THROUGH WHICH ROUTE GOES) | PASS B STATION | INFORMATION OF PASSING POSITION (OPTION) |
| | TOTAL NUMBER OF AREA IDs | 4 | TOTAL NUMBER OF AREA IDs |
| | RATIO OF LTE AREA | 50% | RATIO OF LTE AREAS ON ROUTE |

FIG. 21

| NAME | EXAMPLE VALUE (UNIT) | DESCRIPTION |
|---|---|---|
| RETRIEVAL AREA INFORMATION | a1, a2, a3, a4 | SET AREA WISHED TO BE PUT INTO LTE AREA |
| ANALYSIS INTERVAL | ON OCCASION | INTERVALS OF ANALYSIS (REGULARLY OR OCCASIONALLY) |

FIG. 23

| AREA ID | USER ID | MEASUREMENT TIME | LTE CELL INFO. #1 | | | ... | 3G CELL INFO. #1 | | | ... | TERMINAL TYPE | THE NUMBER OF TIMES OF RECORDING | |
|---|---|---|---|---|---|---|---|---|---|---|---|---|---|
| | | | physCellId | rsrq-Result | rsrp-Result | | Cell Identity | CPICH Ec/N0 | CPICH RSCP | | | LTE | 3G |
| a1 | 001 | 2011/01/19 01:00:00 | | | | ... | 001 | −12.0(dB) | −90(dBm) | ... | 3G/LTE DUAL TERMINAL | 0 | 3 |
| | 002 | 2011/01/19 01:00:00 | | | | ... | 001 | −12.0(dB) | −90(dBm) | ... | 3G/LTE DUAL TERMINAL | 0 | 3 |
| a2 | 001 | 2011/01/19 01:00:00 | | | | ... | 001 | −12.0(dB) | −90(dBm) | ... | 3G/LTE DUAL TERMINAL | 0 | 3 |
| | 002 | 2011/01/19 01:00:00 | | | | ... | 001 | −12.0(dB) | −90(dBm) | ... | 3G/LTE DUAL TERMINAL | 0 | 3 |
| a3 | 003 | 2011/01/19 01:00:00 | | | | ... | 001 | −12.0(dB) | −90(dBm) | ... | 3G TERMINAL | 0 | 3 |
| | 004 | 2011/01/19 01:00:00 | | | | ... | 001 | −12.0(dB) | −90(dBm) | ... | 3G TERMINAL | 0 | 3 |
| a4 | 003 | 2011/01/19 01:00:00 | | | | ... | 001 | −12.0(dB) | −90(dBm) | ... | 3G TERMINAL | 0 | 3 |
| | 004 | 2011/01/19 01:00:00 | | | | ... | 001 | −12.0(dB) | −90(dBm) | ... | 3G TERMINAL | 0 | 3 |

FIG. 24

| NAME | EXAMPLE VALUE (UNIT) | DESCRIPTION |
|---|---|---|
| AREA WHERE 3G/LTE DUAL TERMINAL IS COMMUNICATING VIA 3G | a1, a2 | AREA ID OF AREA WHERE 3G/LTE DUAL TERMINAL IS COMMUNICATING VIA 3G |

FIG. 25

| NAME | EXAMPLE VALUE (UNIT) | DESCRIPTION |
|---|---|---|
| INFORMATION OF STATION ESTABLISHMENT RETRIEVAL AREA | b1, b2 | SET NEW LET AREA WISHED TO CONFIRM NORMALITY OF LET |
| ANALYSIS INTERVAL | ON OCCASION | INTERVALS OF ANALYSIS (REGULARLY OR OCCASIONALLY) |

FIG. 27

| AREA ID | USER ID | MEASUREMENT TIME | LTE CELL INFO. #1 | | | ... | 3G CELL INFO. #1 | | | ... | TERMINAL TYPE | THE NUMBER OF TIMES OF RECORDING | |
|---|---|---|---|---|---|---|---|---|---|---|---|---|---|
| | | | physCellId | rsrq-Result | rsrp-Result | | Cell Identity | CPICH Ec/N0 | CPICH RSCP | | | LTE | 3G |
| b1 | 001 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| | 002 | 2011/01/19 01:00:00 | 001 | -12.0(dB) | -90(dBm) | ... | 001 | -12.0(dB) | -90(dBm) | ... | 3G/LTE DUAL TERMINAL | 3 | 0 |
| b2 | 001 | 2011/01/19 01:00:00 | | | | ... | 001 | -12.0(dB) | -90(dBm) | ... | 3G/LTE DUAL TERMINAL | 0 | 3 |
| | 002 | 2011/01/19 01:00:00 | | | | ... | 001 | -12.0(dB) | -90(dBm) | ... | 3G/LTE DUAL TERMINAL | 0 | 3 |

FIG. 28

| NAME | EXAMPLE VALUE (UNIT) | DESCRIPTION |
|---|---|---|
| AREA CONFIRMED TO COME INTO NORMAL LTE | b1 | AREA ID OF AREA CONFIRMED TO COME INTO IN NORMAL LTE |

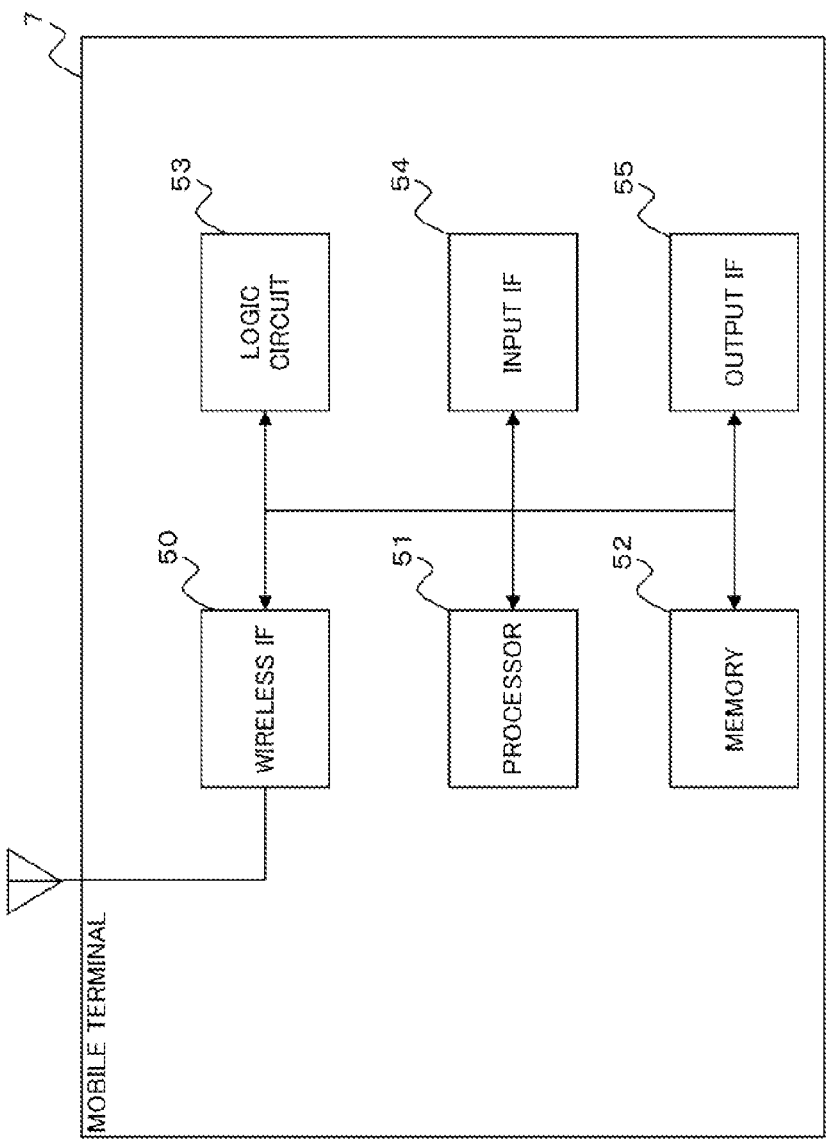

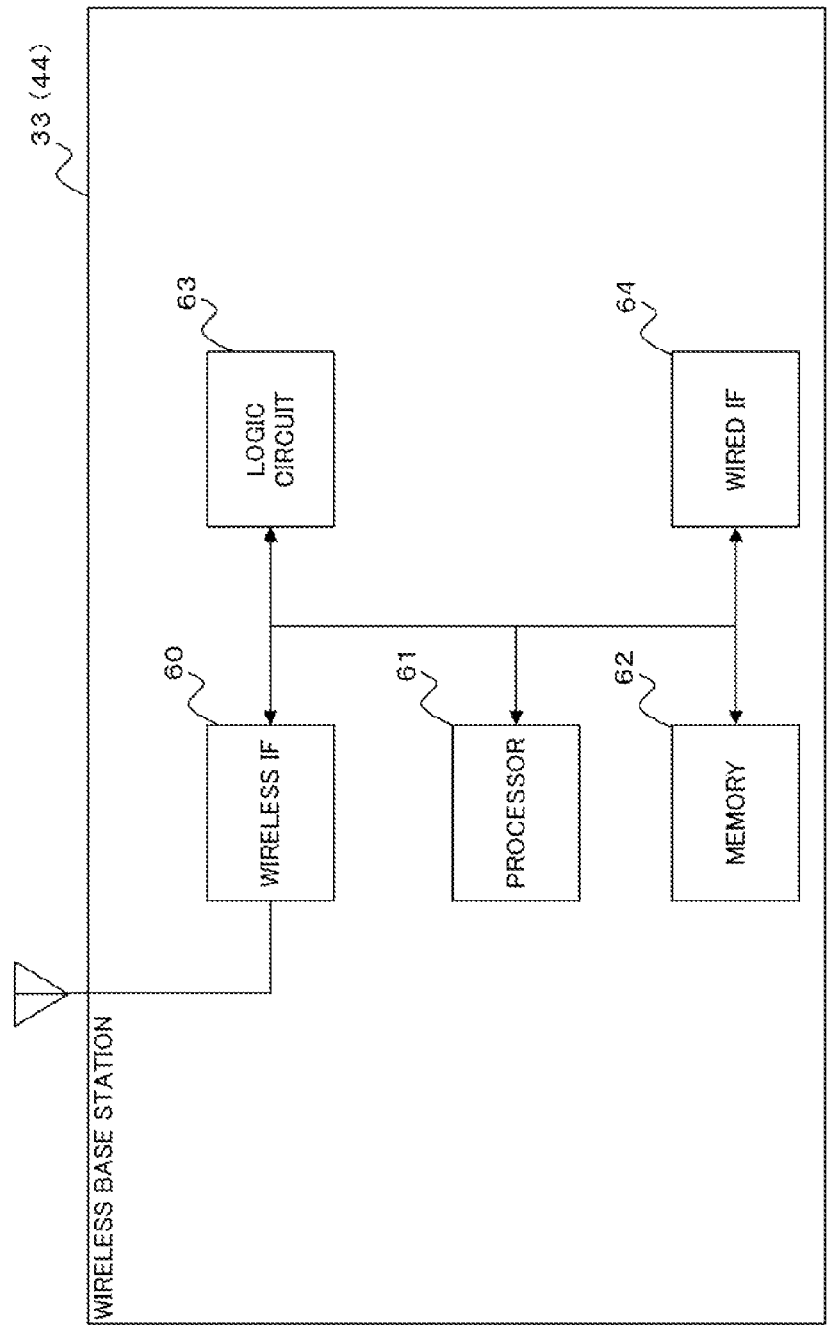

COMMUNICATION APPARATUS, METHOD FOR COMMUNICATION, WIRELESS COMMUNICATION SYSTEM, WIRELESS BASE STATION, AND MOBILE USER TERMINAL

CROSS-REFERENCE TO RELATED APPLICATION

This application is based upon and claims the benefit of priority of the prior Japanese Application No. 2011-117269 filed on May 25, 2011 in Japan, the entire contents of which are hereby incorporated by reference.

FIELD

The embodiments discussed herein are related to a communication apparatus, a method for communication, a wireless communication system, a wireless base station, and a mobile user terminal.

BACKGROUND

In addition to voice communication service, the recent mobile communication is developing in providing various services, such as access to Internet, distribution of streaming broadcasting, and distribution of contents such as music and images. In order to provide high-quality service to anywhere, enhancement in communication speed and expansion of wireless area is demanded.

For the above, Long Term Evolution (LTE), which is a developed form of 3rd Generation (3G), is specified and is put into commercial use.

Since a wireless communication scheme using LTE is highly compatible with that using 3G, LTE wireless areas (hereinafter simply called LTE areas) are being introduced so as to overlap 3G wireless areas, which are already put into practice over a large areas.

At the beginning of introducing LTE service, LTE areas are locally developed around stations and commerce facilities that expect a larger number of prospective users of LTE service and then areas that can receive LTE service seem to be widened.

For example, at the beginning of introducing LTE service when LTE areas are localized, subscribers (users) of LTE service may sometimes use mobile user terminals (hereinafter called 3G/LTE dual terminals) that can use both LTE service and 3G service.

Using a 3G/LTE dual terminal makes the user of the LTE service to receive the LTE service in LTE areas and to receive the 3G service in 3G areas that are not put into LTE areas yet.

The position of an evolved Node-B (eNB) having a communication function compatible with LTE is determined by, for example, a station establishment planning system of a communication carrier. Therefore, the station establishment planning system preferably grasps LTE areas and 3G areas that are not put into LTE areas yet, so that stations (i.e., eNBs) can be efficiently arranged.

Furthermore, since users tend to desire LTE service, which is faster than 3G service, users are preferably notified of LTE areas and 3G areas that are not put into LTE areas yet.

Here, an example of a method of detecting above areas involves measuring a wireless wave from an eNB by an LTE wireless-wave measuring car (LTE measuring car) that is capable of measuring the wireless wave from an eNB and detects LTE areas on the basis of the result of the measurement. In the above detection using an LTE measuring car, the above areas (i.e., LTE areas and 3G areas) can be detected by measuring the wireless wave from an eNB by the LTE measuring car and managing the result of the measurement and the position of the LTE measuring car when the measurement is performed in association with each other.

In this case, the station establishment planning system preferentially arranges an eNB in a 3G area which is not put into an LTE area yet and which has a high population density on the basis of, for example, a result of the detection by the LTE measuring car and population information included in known region mesh information.

Also in this case, users can grasp LTE areas and 3G areas by accessing and browsing an area map indicating the LTE areas and the 3G areas which map is created on the basis of the result of the measurement by an LTE measuring car.

However, the method of detecting areas by the LTE measuring car may not measure wireless wave in areas privately owned, may have poor immediacy of detection result because it takes long time to measure wireless wave over a wide area, and may take costs for the measurement.

SUMMARY (1) According to an aspect of the embodiments, an apparatus includes a communication apparatus including: a receiver that receives positioning information of a mobile user terminal from the mobile user terminal which is able to communicate by using at least one wireless communication scheme; and a detector that detects one or more communicable areas that allow communication by using the at least one wireless communication scheme, by determining which area includes a position indicated by the positioning information among a plurality of areas.

(2) According to an aspect of the embodiments, a method includes a method for communication including: receiving positioning information of a mobile user terminal, which is able to communicate by using at least one wireless communication scheme, from the mobile user terminal; and detecting one or more communicable areas that allow communication by using at least one wireless communication scheme, by determining which area includes a position indicated by the positioning information among a plurality of areas.

(3) According to an aspect of the embodiments, an apparatus includes a wireless base station communicable with a mobile user terminal which is able to communicate by using at least one wireless communication scheme, the wireless base station including: a receiver that receives information of one or more communicable areas that allow communication by using the at least one wireless communication scheme, the communicable areas being detected by determining which area includes a position indicated by positioning information of the mobile user terminal from the mobile user terminal among a plurality of areas; and a transmitter that transmits the information of the communicable areas to the mobile user terminal.

(4) According to an aspect of the embodiments, an apparatus includes a mobile user terminal which is able to communicate by using at least one wireless communication scheme, including: a transmitter that transmits positioning information of the mobile user terminal; and a receiver that receives information of one or more communicable areas that allow communication by using the at least one wireless communication scheme, the areas being detected by determining which area includes a position indicated by the positioning information among a plurality of areas.

(5) According to an aspect of the embodiments, an apparatus includes a mobile user terminal which is able to communicate by using at least one wireless communication scheme, including: a determiner that determines whether the mobile user terminal is communicable by using the at least one wireless communication scheme at a current position of the mobile user terminal; and a transmitter that transmits the result of the determining by the determiner and positioning information of the mobile user terminal in association with each other.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram illustrating an example of user information used in LTE;

FIG. 4 is a diagram illustrating an example of user information used in 3G;

FIG. 6 is a diagram illustrating an example of map data;

FIG. 7 is a diagram illustrating an example of a table;

FIG. 8 is a diagram illustrating an example of notification setting information;

FIG. 9 is a flow diagram illustrating an example of operation of a controller;

FIG. 10 is a diagram illustrating an example of a result of retrieval based on notification setting information of FIG. 8;

FIG. 11 is a diagram illustrating an example of a result of determining on LTE area;

FIG. 13 is a diagram illustrating an example of a result of determining a failure area;

FIG. 15 is a diagram illustrating an example of route retrieval information;

FIG. 17 is a diagram illustrating an example of relationship between route data and an area ID:

FIG. 18 is a diagram illustrating an example of a result of extracting a passing area ID;

FIG. 19 is a diagram illustrating an example of a result of route retrieval;

FIG. 21 is a diagram illustrating an example of LTE area setting information;

FIG. 23 is a diagram illustrating an example of a result of retrieval based on the LTE area setting information of FIG. 21;

FIG. 24 is a diagram illustrating an example of a result of determining an LTE promoting area;

FIG. 25 is a diagram illustrating an example of LTE area confirmation setting information;

FIG. 27 is a diagram illustrating an example of a result of retrieval based on LTE area confirmation setting information of FIG. 25;

FIG. 28 is a diagram illustrating an example of a result of confirming an LET area;

FIG. 30 is a diagram illustrating an example of the hardware configuration of a mobile user terminal; and FIG. 31 is a diagram illustrating an example of the hardware configuration of a wireless base station.

DESCRIPTION OF EMBODIMENTS

Hereinafter, description will now be described in relation to an embodiment of the present invention with reference to the accompanying drawings. However, the embodiment to be detailed below is merely an example and there is no intention to exclude modification and application to a technique that are not detailed in the following embodiment and modifications. In other words, the following embodiment and the modifications can be, of course, carried out without departing the sprit of the present invention.

Figure 1:
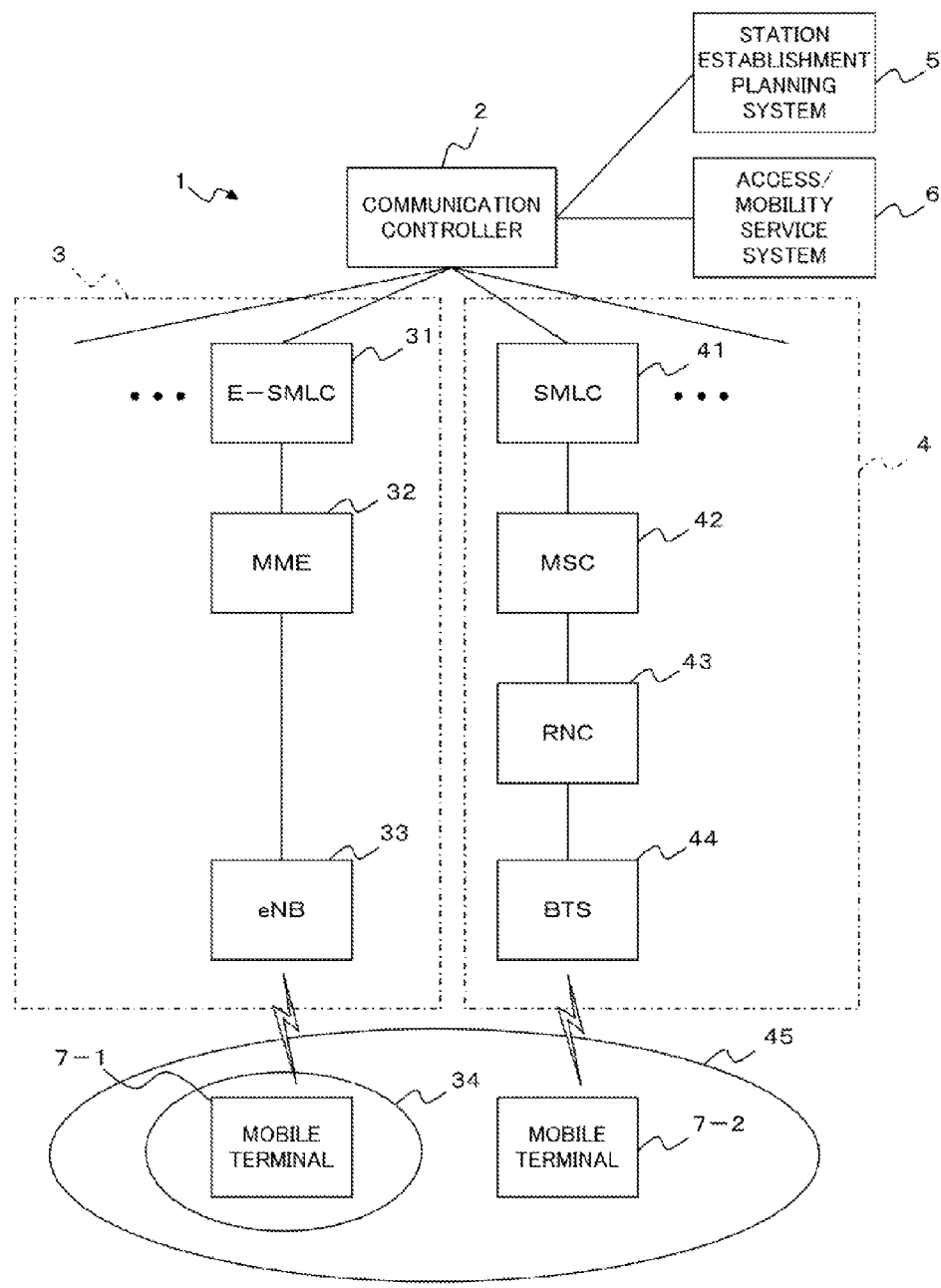
FIG. 1 is a diagram illustrating an example of a wireless communication system according to a first embodiment.

(1) First Embodiment (1-1) Example of the Configuration of a Wireless Communication System of the First Embodiment FIG. 1 is a diagram illustrating an example of the configuration of a wireless communication system according to the first embodiment.

The wireless communication system 1 of FIG. 1 exemplarily includes a communication controller 2, an LTE device group (hereinafter simply called LTE system) 3, a 3G device group (hereinafter simply called 3G system) 4, and at least one mobile user terminal (hereinafter sometimes called mobile terminal) 7-1 (and 7-2). Hereinafter, when the mobile terminals 7-1 and 7-2 are not discriminated from each other, the mobile terminals are represented by reference number 7. In addition, the number of mobile terminals 7 is not limited to that of FIG. 1.

The wireless communication system 1 may be connected to external systems such as a station establishment planning system 5 that arranges an eNB 33 included in the LTE system 3, and a access/mobility service system 6 that provides route information to the mobile terminals 7-1 and 7-2.

The following description assumes that the wireless communication system 1 concurrently uses a wireless communication scheme compatible with LTE and compatible with 3G, but the communication schemes are not limited to those compatible with LTE and 3G. The following description assumes that an example of a wireless communication scheme compatible with 3G is W-CDMA (Wideband Code Division Multiple Access), but there is no intention to limit the scheme to W-CDMA.

The LTE system 3 exemplarily includes an E-SMLC (Enhanced-Serving Mobile Location Center) 31, a Mobility Management Entity (MME) 32, and eNB 33. The number of E-SMLCs 31, that of MMEs 32, and that of eNBs 33 are not limited to those of FIG. 1. For example, the number of MMEs 32 connected to each E-SMLC 31, and the number of eNBs 33 connected to each MME 32 are not limited to those of FIG. 1.

Here, in the LTE system 3, a user information request message that requests user information of a mobile terminal 7 is sent from the E-SMLC 31 through in sequence the MME 32, and the eNB 33 to the mobile terminal 7-1, which is positioning in an LTE area 34, as a serving cell, that the eNB 33 provides. The LTE area 34 is a wireless area consisting of at least one LTE cell. The user information request message may be sent to the mobile terminal 7-1 periodically or occasionally. The mobile terminal 7-1 of FIG. 1 is a 3G/LTE dual terminal adapted to both the LTE service and the 3G service. Alternatively, the mobile terminal 7-1 may be an LTE-dedicated terminal adapted to the LTE service but not adapted to the 3G service.

Upon receipt of the user information request message from the eNB 33, the mobile terminal 7-1 measures the current position of the mobile terminal 7-1 by using, for example, a Global Positioning System (GPS). In addition, upon receipt of the user information request message from the eNB 33, the mobile terminal 7-1 may measure wireless quality exemplified by a degree of wireless interference and intensity of receiving wireless (radio) wave from the eNB 33.

Then, the mobile terminal 7-1 sends the positioning information, that is the result of measuring the position of the terminal, to the eNB 33. The positioning information can be sent in the form of LTE user information (e.g., see FIG. 3) including the positioning information and wireless quality information that is the result of measuring the wireless quality of the eNB 33. Besides, the mobile terminal 7-1 may measure the wireless quality of an ambient BTS 44 and send the measured quality to the eNB 33 in the form of being included in the LTE user information.

The LTE user information from the mobile terminal 7-1 is sent through the eNB 33 and the MME 32 to the E-SMLC 31, so that at least one of the eNB 33, the MME 32, and the E-SMLC 31 may grasp the contents of LTE user information.

The 3G system 4 exemplarily includes a Serving Mobile Location Center (SMLC) 41, a Mobile Switching Center (MSC) 42, a Radio Network Controller (RNC) 43, and a Base Transceiver Station (BTS) 44. The number of SMLCs 41, that of MSCs 42, that of RNCs 43, and that of BTSs 44 are not limited to those of FIG. 1. For example, The number of MSCs 42 connected to each SMLC 41, the number of RNCs 43 connected to each MSC 42, and the number of BTSs 44 connected to each RNC 43 are not limited to those of FIG. 1.

Here, in the 3G system 4, a user information request message that requests user information of the mobile terminal 7 is sent from the SMLC 41 through in sequence the MSC 42, the RNC 43, and the BTS 44 to the mobile terminal 7-2, which is positioning in a 3G area 45, as a serving cell, that the BTS 44 provides. The 3G area 45 is a wireless area consisting of at least one 3G cell. The user information request message may be sent to the mobile terminal 7-2 periodically or occasionally. The mobile terminal 7-2 of FIG. 1 is a 3G/LTE dual terminal adapted to both the LTE service and the 3G service. Alternatively, the BTS 44 similarly sends the user information request to a 3G-dedicated terminal adapted to the 3G service but not adapted to the LTE service.

Upon receipt of the user information request message from the BTS 44, the mobile terminal 7-2 measures the current position of the mobile terminal 7-2 by using, for example, a GPS. In addition, upon receipt of the user information request message from the BTS 44, the mobile terminal 7-2 may measure wireless quality exemplified by a degree of wireless interference and intensity of receiving wireless (radio) wave from the BTS 44.

Then, the mobile terminal 7-2 sends the positioning information, that is, the result of measuring the position of the terminal, to the BTS 44. The positioning information can be sent in the form of 3G user information (e.g., see FIG. 4) including the positioning information and wireless quality information that is the result of measuring the wireless quality of the BTS 44. Besides, upon receipt of the user information request message from the BTS 44, a 3G-dedicated terminal may send the BTS 44 3G user information including the positioning information of the terminal and the wireless quality information of the BTS 44.

The 3G user information from the mobile terminal 7-2 is sent through in sequence the BTS 44, the RNC 43, and the MSC 42 to the SMLC 41. The 3G user information from a 3G-dedicated terminal may also be sent through in sequence the BTS 44, the RNC 43, and the MSC 42 to the SMLC 41. Thereby, at least one of the BTS 44, the RNC 43, the MSC 42, and the SMLC 41 can grasp the contents of the 3G user information.

At least one of the E-SMLC 31, the MME 32, and the eNB 33 is connected to the communication controller 2 and notifies LTE user information to the communication controller 2. Besides, at least one of the SMLC 41, the MSC 42, the RNC 43, and the BTS 44 is connected to the communication controller 2, and notifies 3G user information to the communication controller 2.

The communication controller 2 determines, for example, which area among a number of areas covering a predetermined region includes a position indicated by the positioning information of the mobile terminal 7-1 included in the LTE user information, and thereby detects one or more communicable areas such as LTE areas that allow communication by using at least one communication scheme. In addition, the communication controller 2 may determine which area among a number of areas includes a position indicated by the positioning information of the mobile terminal 7-2 included in the 3G user information, and thereby detect one or more areas such as 3G areas that are not put into LTE areas yet.

As the above, the first embodiment detects, on the basis of the positioning information notified from at least one mobile terminal 7, one or more wireless areas that allow wireless communication through a predetermined wireless communication scheme, which makes it possible to efficiently detect a wireless area even if the area is privately owned. Detection of wireless areas on the basis of positioning information from two or more mobile terminals 7 shortens time to measure a wide area, so that the immediacy of the detection result can be enhanced. In addition, facility cost for an LTE measuring car and labor cost for measuring can be suppressed to largely reduce the cost for measuring areas.

Next, examples of the configuration and the operation of the communication controller 2 will now be detailed.

(1.2) Examples of the Configuration and the Operation of the Communication Controller 2

Figure 2:
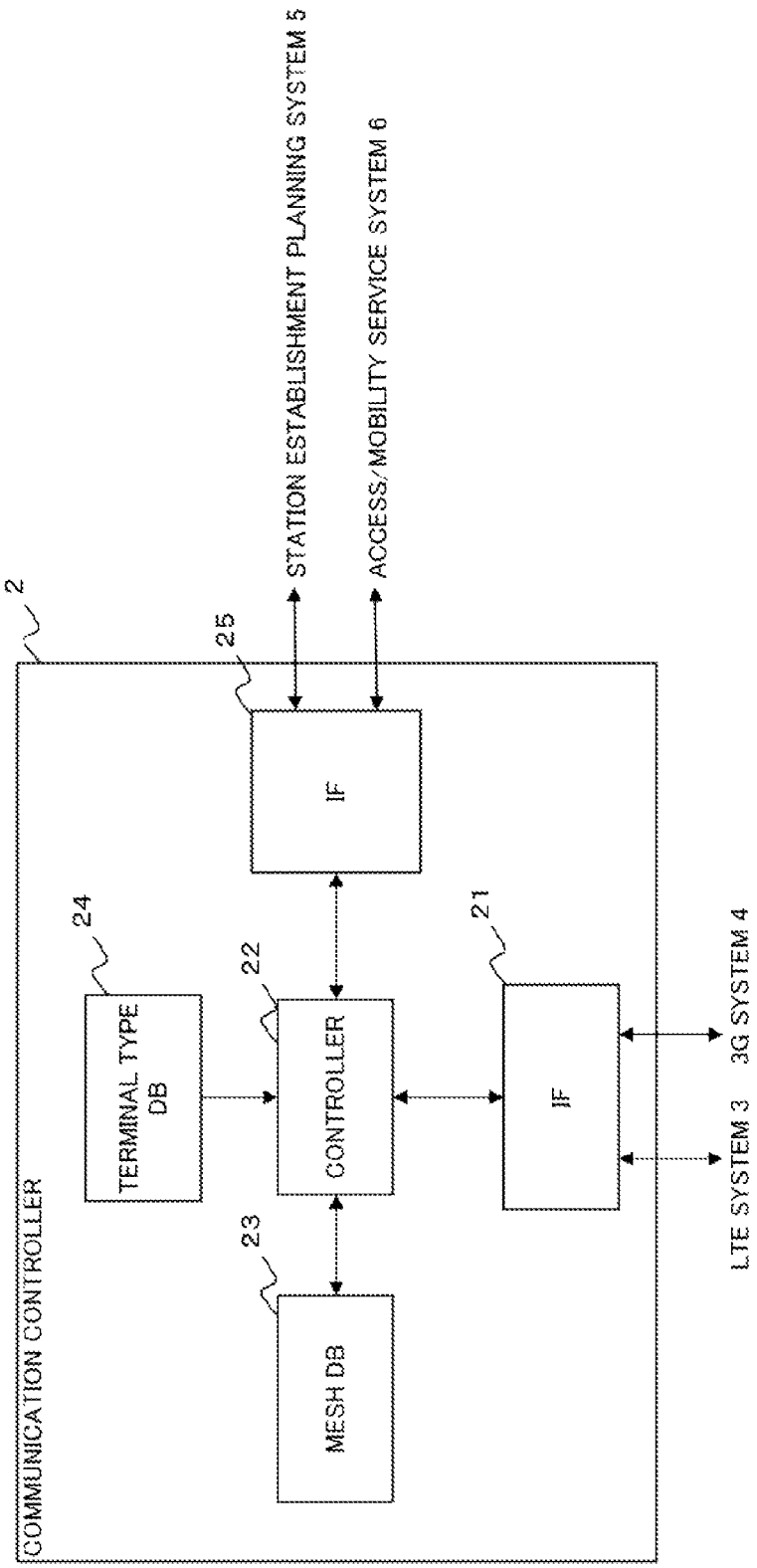
FIG. 2 is a block diagram illustrating the configuration of a communication controller of FIG. 1.

FIG. 2 illustrates an example of the configuration of the communication controller 2.

The communication controller 2 exemplarily includes an interface (IF) 21, a controller 22, a mesh database (mesh DB) 23, a terminal type information database (terminal type DB) 24, and an IF 25.

The IF 21 receives LTE user information from the LTE system 3, and notifies the received LTE user information to the controller 22. The LTE user information includes, as the example FIG. 3 depicts, user ID, measurement time, positioning information, wireless quality information, and terminal type information. Namely, the IF 21 functions as an example of a receiver that receives positioning information of a mobile terminal 7 which is able to communicate by using at least one wireless communication scheme.

The IF 21 is capable of notifying the result of detection by the controller 22, which will be detailed below, to a mobile terminal 7 through the LTE system 3 or the 3G system 4. The IF 21 also functions as an example of a notifier that notifies the result of the detecting by the controller 22 to the mobile terminal 7.

Here, description will now be made in relation to various pieces of information included in the LTE user information of FIG. 3.

"User ID" is identification information to identify the user of a mobile terminal 7 and is exemplified by an International Mobile Subscriber Identity (IMSI).

"Measurement time" is information that indicates the time when the terminal 7 detects the then position of the terminal itself, and is exemplified by a date parameter at that time.

"Positioning information" is information indicating the position of the mobile terminal 7 at the above measured time and is exemplified by the latitude, the longitude, and the altitude of the mobile terminal 7. For example, the latitude information includes a latitudeSign parameter indicating the north latitude (north) or the south latitude (south) and a latitude parameter indicating the latitude of the position of the mobile terminal 7. The longitude information includes a longitude parameter indicating the longitude of the position of the mobile terminal 7. The altitude information includes an altitudeDirection parameter indicating the height or the depth and an altitude parameter indicating the altitude of the position of the mobile terminal 7. The "positioning information" is obtained through, for example, GPS measurement, as described above.

"Wireless quality information" is information indicating at least the wireless quality of the eNB 33 at the measurement time of the mobile terminal 7. The wireless quality information includes LTE cell information of at least one LTE cell including, for example, identification information to identify the LTE cell, the degree of interference of the LTE cell, and the reception intensity of the LTE cell. For example, assuming that m (natural number) LTE cells are disposed around a mobile terminal 7, wireless quality information containing the above pieces of information of each of the m LTE cells is stored in the LTE user information.

The identification information to identify an LTE cell is exemplified by a physCellId parameter indicating the ID of the LTE cell. The degree of interference and intensity of reception at the LTE cell are respectively exemplified by an rsrq-Result parameter indicating the reception quality of a known signal such as a pilot signal and an rsrp-Result parameter indicating the reception power of the same known signal.

In addition, the wireless quality information may include information indicating the wireless quality of the BTS 44 at the measurement time. In this case, the wireless quality information includes 3G cell information of at least one 3G cell including identification information to identify the 3G cell, the degree of interference of the 3G cell, and the reception intensity of the 3G cell. For example, assuming that n (natural number) 3G cells are disposed around a mobile terminal 7, wireless quality information containing the above pieces of information of each of the n 3G cells is stored in the LTE user information.

The identification information to identify a 3G cell is exemplified by a Cell Identity parameter indicating the ID of the 3G cell. The degree of interference and intensity of reception at the 3G cell are respectively exemplified by a CPICH Ec/N0 parameter indicating a ratio of a reception power of a known signal such as a pilot signal and a power of interference and noise, and a CPICH RSCP parameter indicating the reception power of the same known signal.

"Terminal type information" is specification information to specify the terminal type of the mobile terminal 7, and is exemplified by an IMEI Software Version (IMEI-SV).

The values (units) of the values of FIG. 3 are merely examples and there is no intention to exclude application of other parameters. The pieces of information of the LTE user information used here are defined in the positioning information standard of 3GPP, i.e., "3GPP TS 36.355 (LTE Positioning Protocol (LPP)), TS 36.331 (Evolved Universal Terrestrial Radio Access (E-UTRA) Radio Resource Control (RRC) Protocol specification)". However, other parameters can be similarly used.

The IF 21 may receive 3G user information from the 3G system 4, and notify the received 3G user information to the controller 22.

As depicted in FIG. 4, the 3G user information differs from the LTE user information in the point of not including the information about an LTE cell included in the LTE user information, but is the same as the LTE user information in the remaining points, so repetitious description is omitted here. The values (units) of the values of FIG. 4 are merely examples and there is no intention to exclude application of other parameters. The pieces of information of the 3G user information used here are defined in the positioning information standard of 3GPP, i.e., "3GPP TS 25.331 Radio Resource Control (RRC), 3GPP TS 25.413 Radio Access Network Application Part (RANAP)". However, other parameters can be similarly used. Hereinafter, when LTE user information and 3G user information are not discriminated from each other, LTE user information and 3G user information are merely referred to as "user information".

The terminal type DB 24 holds the terminal type information included in user information and the terminal type of the mobile terminal 7 in association with each other. The terminal type DB 24 of FIG. 2 takes a form of a memory incorporated in the communication controller 2, but may alternatively be an external memory connected to the communication controller 2.

The IF 25 functions as an interface with external systems such as a station establishment planning system (station establishing system) 5 that establishes (arranges) eNBs 33 and access/mobility service system 6 that provides route information related to a route connecting a number of positions.

Specifically, the IF 25 receives the route information (e.g., route retrieval information of FIG. 16) from the access/mobility service system 6, receives information (e.g., LTE area setting information of FIG. 24) related to an area promoted to be an LTE area, and information (e.g., LTE area confirmation setting information of FIG. 28) related to an area to be confirmed whether or not the area is put into an LTE area, and notifies the received information to the controller 22. The IF 25 is capable of notifying result of retrieval in the controller 22 to the station establishment planning system 5 and/or the access/mobility service system 6. The function of the IF 25 to cooperate with these external systems will be detailed below. If the communication controller 2 does not cooperate with an external system, the communication controller 2 may not include the IF 25.

The mesh DB (memory) 23 stores (holds) a table (e.g., FIG. 7) associating map data (e.g., FIG. 6) of a predetermined region divided into a number of area blocks with information of the mobile terminal 7. The mesh DB 23 of FIG. 2 takes a form of a memory incorporated in the communication controller 2, but may alternatively be an external memory connected to the communication controller 2.

Here, the controller 22 detects an LTE area on the basis of the positioning information of the mobile terminal 7-1 received by the IF 21. The controller 22 may further detect a 3G area on the basis of the positioning information of the mobile terminal 7-2 received by the IF 21.

Namely, the controller 22 functions as an example of a detector that detects one or more communicable areas that allow communication by using at least one wireless communication scheme by determining which area among a number of areas includes a position indicated by the positioning information of a mobile terminal.

Here, the operation of the controller 22 will now be described with reference to FIG. 5.

Figure 5:
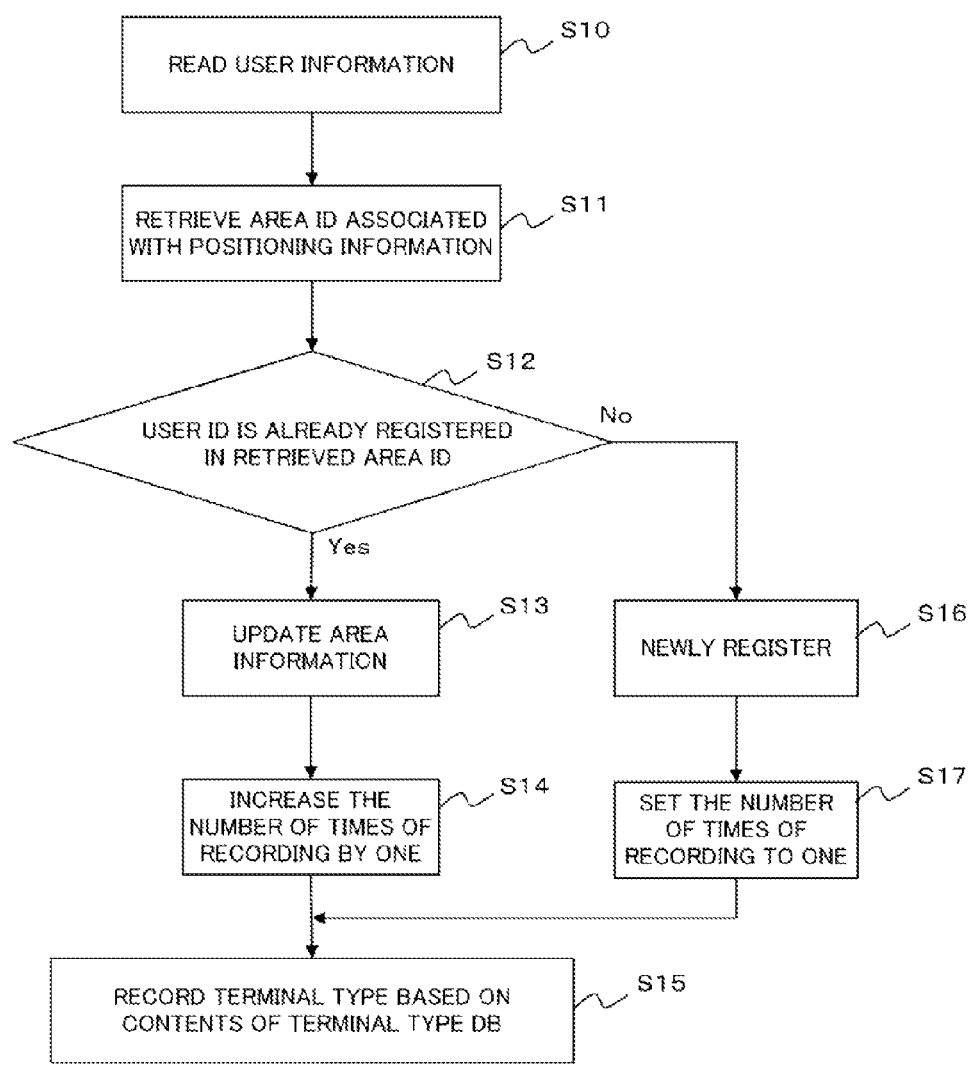
FIG. 5 is a flow diagram illustrating an example of operation of a controller.

As illustrated in FIG. 5, the controller 22 reads user information notified from the IF 21 (step S10).

Then, on the basis of the positioning information of the mobile user terminal 7 included in the user information, the controller 22 determines which area block in the map data in the mesh DB 23 the mobile terminal 7 is currently positioning.

FIG. 6 illustrates an example of the map data. In the example of FIG. 6, assuming that a region is defined in latitude 35 degrees, 39 minutes, 30.900 seconds through latitude 35 degrees, 39 minutes, 30.905 seconds and in longitude 139 degrees, 44 minutes, 43.600 seconds through longitude 139 degrees, 44 minutes, 43.605 seconds is divided in the latitude direction into five area blocks "1" through "5" at a pitch of 0.001 second, and concurrently is divided in the longitude direction into five area blocks "a" through "e" at a pitch of 0.001 second. Thereby, the region is divided into 25 area blocks each assigned one of 25 area IDs of "a1" through "e5". The example of FIG. 6 omits information of the altitude to simplify the description. If altitude is similarly considered, the mesh DB 23 may hold data a number of map data of FIG. 6 at a pitch of a predetermined height. In example of FIG. 6, the region defined in terms of the latitude and the longitude is divided into mesh area at a pitch of a 0.001 second in both latitude and longitude direction, but the shapes and the sizes of area blocks are not limited to those of FIG. 6. For example the pitch of dividing into area blocks may be changed with the density or the magnitude of population based on known population data. In this case, it is preferable that a region of a higher density population or a larger population is divided into area blocks at a smaller pitch while a region of a lower density population or a smaller population is divided into area blocks at a larger pitch. Furthermore, omitted in FIG. 6, the map data may include road data indicating the position of roads and expressways, and track data indicating the position of railroads, so that the controller 22 may easily detect the relationship of roads and railroads with area blocks.

In view of improving the accuracy of area detection, it is preferable that each area block is set to be narrower than a cell area.

Then, the controller 22 retrieves the area ID of an area block in which the mobile user terminal 7 is currently positioning on the basis of the positioning information of the mobile user terminal 7 included in the user information and the above map data (step S11).

Next, the controller 22 determines whether the table in the mesh DB 23 stores the area ID retrieved in step S11 and the user ID included in the user information read in step S10 in association with each other (whether the user ID is already stored in the area ID in the table of the mesh DB 23) (step S12).

If the user ID is not registered in the area ID (No route in step S12), the controller 22 stores the user ID, the measurement time, and the wireless quality information included in the user information into the table in association with the area ID (step S16).

In addition, the controller 22 sets the number of times of recording the entry of the same user ID to "1" (step S17). Specifically, if the controller 22 receives LTE cell information for the user ID, the number of times of LTE recording is set to "1" while if the controller 22 receives 3G cell information for the user ID, the number of times of 3G recording is set to "1".

Conversely, if the user ID is already registered in the area ID (Yes route of step S12), the controller 22 updates the measurement time and the wireless quality information on the user ID registered in the area ID (step S13).

Then, the controller 22 updates the number of times of recording the entry of the same user ID by increasing the number by "1" (step S14). Specifically, if the controller 22 receives LTE cell information for the user ID, the number of times of LTE recording is increased while if the controller 22 receives 3G cell information for the user ID, the number of times of 3G recording is increased.

After that, the controller 22 determines, on the basis of the contents in the terminal type DB 24, whether mobile user terminal 7 that sends the user information is a 3G/LTE dual terminal, an LTE-dedicated terminal, or a 3G-dedicated terminal, and records the result of the determination into the table (step S15).

In other words, the controller 22 functions as an example of a memory controller that stores information related to one or more detected communicable areas and an area block accommodating the mobile terminal into the mesh DB 23 in association with each other. Here, the function of the mesh DB 23 and the memory controller achieved by the controller 22 may be take the form of an external memory connected to the communication controller 2.

When the succession of procedural steps S10 through S17 is accomplished, the communication controller 2 creates a table depicted in, for example, FIG. 7.

Thereby, the communication controller 2 can grasp, on the basis of the contents of the table created in the above manner, one or more communicable areas that are capable of communicating through a predetermined wireless communication scheme such as LTE areas or the 3G areas, and various pieces of information of the mobile user terminal 7.

As the above, the first embodiment detects, on the basis of the positioning information notified from the mobile terminal 7, one or more wireless areas that allow the mobile terminal 7 to carry out communication, which makes it possible to efficiently detect a wireless area even when the area is a privately owned. Detection of wireless areas on the basis of positioning information from two or more mobile terminals 7 shortens time to measure a wide area, so that the immediacy of the detection result can be enhanced. In addition, facility cost for an LTE measuring car and labor cost for measuring can be suppressed to largely reduce the cost for measuring areas.

(1.3) Other Functions of the Communication Controller 2

In addition to the above function of area detection, the communication controller 2 can have at least one of the following functions (a) through (e):

(a) function of notifying a detected LTE area to a user;
(b) function of detecting a communication failure area and notifying the detected communication failure area to the user;

(c) function of attaching information of a detected LTE area to route information and notifying the information to a user;

(d) function of detecting an area being promoted to be an LTE area and notifying the detected are to the station establishment planning system 5; and (e) function of detecting whether an area is correctly put into an LTE area and notifying the result of the detecting to the station establishment planning system 5.

(1.3.1) Function (a) of Notifying a Detected LTE Area to a User

For example, the communication controller 2 can receive notification setting information, which is exemplarily depicted in FIG. 8, from a mobile terminal 7. Alternatively, the notification setting information is received from a user management system owned by a communication carrier by the IF 25.

The notification setting information includes, for example, a user ID indicating the mobile user terminal 7 to be notified an LTE area, and an analysis interval indicating the timing of detection and notification of an LTE area is regularly or occasionally. In the example of FIG. 8, a terminal to be notified an LTE area is set to be a mobile user terminal 7 having the user ID "003" and an LTE area is set to be detected and notified occasionally, specifically, in response to the request from the mobile user terminal 7.

The operation of the controller 22 will now be described with reference to FIG. 9.

As exemplarily depicted in FIG. 9, the controller 22 retrieves, from the table of the mesh DB 23 generated in the above manner, an area ID including the user ID set in the notification setting information (step S20).

Next, the controller 22 extracts one or more area IDs each having a record of 3G cell information of the user ID to be notified among the area IDs obtained through the retrieval in step S20 (step S21).

The controller 22 determines whether one of area IDs extracted in step S21 has a record of the LTE cell information of another user ID different from the user ID to be notified (step S22).

If determining that LTE cell information of another user ID is not recorded (No route in step S22), the controller 22 makes the same determination as that of step S22 on the next area ID among the area IDs extracted in step S21 (step S26).

On the other hand, if determining that LTE cell information of another user ID is recorded (Yes route in step S22), the controller 22 further determines whether the LTE cell information of the user ID is recorded within the past seven days and is recorded six times or more (step S23). The condition of the determination in step S23 is a merely example, and can apply other values, needless to say.

If determining that the condition of step S23 is not satisfied (No route in step S23), the controller 22 moves the procedure to step S26.

Conversely, if determining that the condition of step S23 is satisfied (Yes route in step S23), the controller 22 determines that the area corresponding to the area ID is an LTE area (step S24).

After that, the controller 22 determines whether an area ID that does not undergo the determination of steps S22-S24 is present among the area IDs extracted in step S21 (step S25).

If determining that an area ID not undergoing the determination is present (Yes route in step S25), the controller 22 moves the procedure to step S26 and repeats the procedure of steps S22-S24 on the corresponding area ID not undergoing the determination.

If determining that an area ID not undergoing the determination is not present (No route in step S25), the controller 22 notifies the area ID determined to be an LTE area in step S24 to the mobile user terminal 7 (step S27).

Throughout the above procedure, the controller 22 determines, as depicted in FIG. 10, that the areas having area IDs "a1", "d4", and "d5" are LTE areas within the sphere of the mobile user terminal 7 having the user ID "003".

Thereby, the controller 22 can notify the result of the determination to the mobile user terminal 7 to be notified. The controller 22 may omit the notification related to the area ID "d5" representing the area already providing LTE service to the mobile user terminal 7 having the user ID "003" among area IDs "a1", "d4", and "d5" determined to be LTE areas. In this case, the area IDs "a1" and "d4" to be newly put into LTE areas are notified to the user of the mobile user terminal 7 in the format of FIG. 11.

Figure 14:
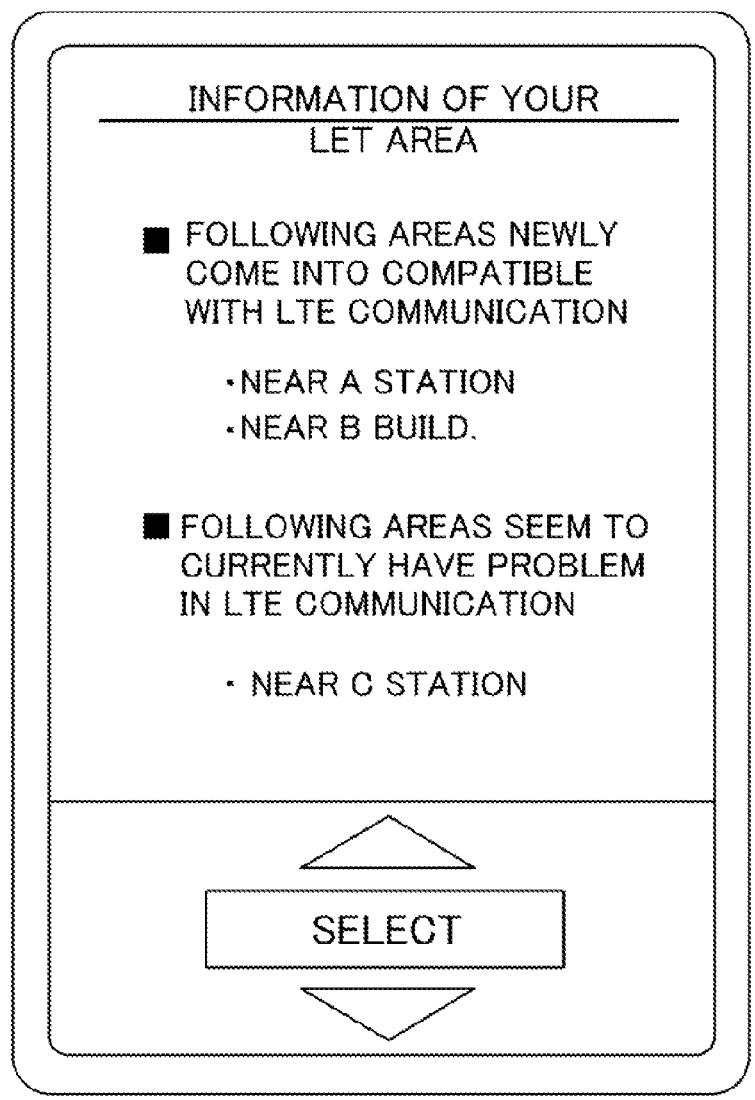
FIG. 14 is a diagram illustrating an example of displayed information on a mobile user terminal.

FIG. 14 is an example of a display screen of the mobile user terminal 7 when receiving the above notification. As illustrated in FIG. 14, the controller 22 may notify not detected area IDs themselves but a name, an abbreviated name, or a familiar name of the place specified by each detected area ID or a name of a landmark positioning within the area. Additionally as illustrated in FIG. 14, information of a communication failure area to be detailed in the following section (1.3.2) may be displayed on the display screen of the mobile user terminal 7.

As the above, this function can surely notify LTE areas to users, so that the convenience to the users can be enhanced.

Alternatively, the IF 21 may notify the result of the detection by the controller 22 to a mobile user terminal 7 which has a record of sending the positioning information by using at least one wireless communication scheme such as LTE in the area included in the result of the detection. This makes it possible to efficiently notify areas communicable through LTE to more users.

Furthermore, the IF 21 may not notify the result of the detection by the controller 22 to a mobile user terminal 7 which has no record of sending the positioning information by using at least one wireless communication scheme such as LTE in the area included in the result of the detection. This can suppress increase in communication in the wireless communication system 1.

(1.3.2) Function (b) of Detecting a Communication Failure Area and Notifying a Detected Communication Failure Area to a User The communication controller 2 may notify a mobile user terminal 7 to be notified set in the notification setting information of FIG. 8 of a communication failure area, which is put into an LTE area but comes to be temporarily incapable of communication due to occurrence of a failure.

Here, the operation of the controller 22 will now be described with reference to FIG. 12.

Figure 12:
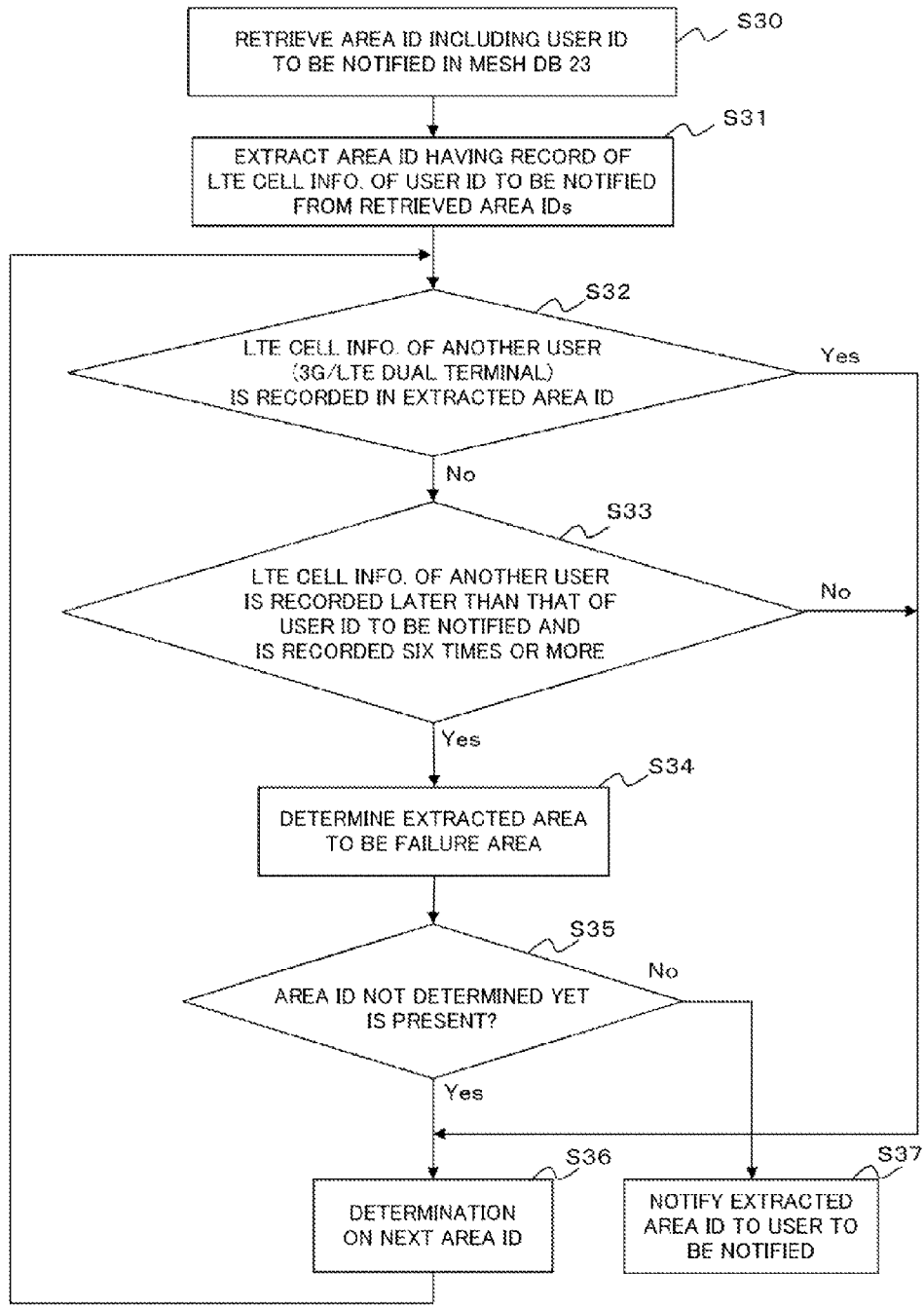
FIG. 12 is a flow diagram illustrating an example of operation of a controller.

As exemplarily depicted in FIG. 12, the controller 22 retrieves an area ID including the user ID set in the notification setting information from the table of the mesh DB 23 generated in the above manner (step S30).

Next, the controller 22 extracts one or more area IDs having a record of LTE cell information of the user ID to be notified from the area IDs retrieved in step S30 (step S31).

The controller 22 determines whether LTE cell information of a user ID which is different from the above user ID to be notified and which has terminal type information "3G/LTE dual terminal" is recorded in one of the area IDs extracted in step S31 (step S32).

If determining that the condition of step S32 is satisfied (Yes route in step S32), the controller 22 makes the same determination as that of step S32 on the next area ID extracted in step S31 (step S36).

Conversely, if determining that the condition of step S32 is not satisfied (No route in step S32), the controller 22 determines, for example, whether the measurement time of LTE cell information of another user ID is later than the measurement time of the user ID to be notified and the LTE cell information of another user ID is recorded six times or more (step S33). The condition of the determination in step S33 is a merely example, and can apply other values, needless to say.

If determining that the condition of step S33 is not satisfied (No route in step S33), the controller 22 moves the procedure to step S36.

Conversely, if determining that the condition of step S33 is satisfied (Yes route in step S33), the controller 22 determines that the area corresponding to the area ID is currently incommunicable through LTE due to a failure, and determines the area to be a communication failure area (step S34).

Then, the controller 22 determines whether an area ID that does not undergo the determination of steps S32-S34 is present among the area IDs extracted in step S31 (step S35).

If determining that an area ID not undergoing the determination is present (Yes route in step S35), the controller 22 moves the procedure to step S36.

If determining that an area ID not undergoing the determination is not present (No route in step S35), the controller 22 notifies the area ID corresponding to an area determined to be a communication failure area in step S34 to the mobile user terminal 7 to be notified (step S37).

Throughout the above procedure, the controller 22 determines, for example, that the area having an area ID "d5" is a communication failure area that is temporarily incapable of LTE communication within the sphere of the mobile user terminal 7 having the user ID "003", and notifies, in the format of FIG. 13, the result of the determination to the mobile user terminal 7 to be notified.

As the above, this function can surely notify a communication failure area that is temporarily incapable of LTE communication due to occurrence of a failure among LTE areas to users, so that the convenience to the users can be enhanced.

FIG. 14 is an example of a display screen of the mobile user terminal 7 when receiving the above notification. As illustrated in FIG. 14, the controller 22 may notify not a detected communication failure area ID itself, but a name, an abbreviated name, or a familiar name of the place specified by the area ID or a name of a landmark positioning in the area.

Alternatively, the IF 21 may notify the result of the detection by the controller 22 to a mobile user terminal 7 which has a record of sending the positioning information by using at least one wireless communication scheme such as LTE in the area included in the result of the detection. This makes it possible to efficiently notify area communicable through LTE to more users.

Furthermore, the IF 21 may not notify the result of the detection by the controller 22 to a mobile user terminal 7 which has no record of sending the positioning information by using at least one wireless communication scheme such as LTE in the area included in the result of the detection. This can suppress increase in communication in the wireless communication system 1.

(1.3.3) Function (c) of Attaching Information of a Detected LTE Area to Route Information and Notifying the Information to a User The communication controller 2 can receive route retrieval information exemplarily depicted in FIG. 15 from the access/mobility service system 6. Alternatively, the access/mobility service system 6 may notify the route retrieval information to communication controller 2 in response to a retrieval request from a mobile user terminal 7 to the access/mobility service system 6.

The route retrieval information includes, for example, a route retrieval type, departure position information, arrival position information, and another information such as information of a passing position. The route retrieval type indicates a type of a route, such as by train (line), by car, or by walk (road). The departure position information and the arrival position information relate to the positions of the departure and the arrival of the route to be retrieved, respectively, and use station names, spot names, and coordinates. The passing position information is optional information related to a point through which the route to be retrieved passes between the departure position to the arrival position, and uses a station name, a spot name, and coordinates.

The example of FIG. 15 sets the route retrieval type to by train, the departure position to A station, the arrival position to D station, the optional information related to a passing position to none.

Here, the operation of the controller 22 will now be described with reference to FIG. 16.

Figure 16:
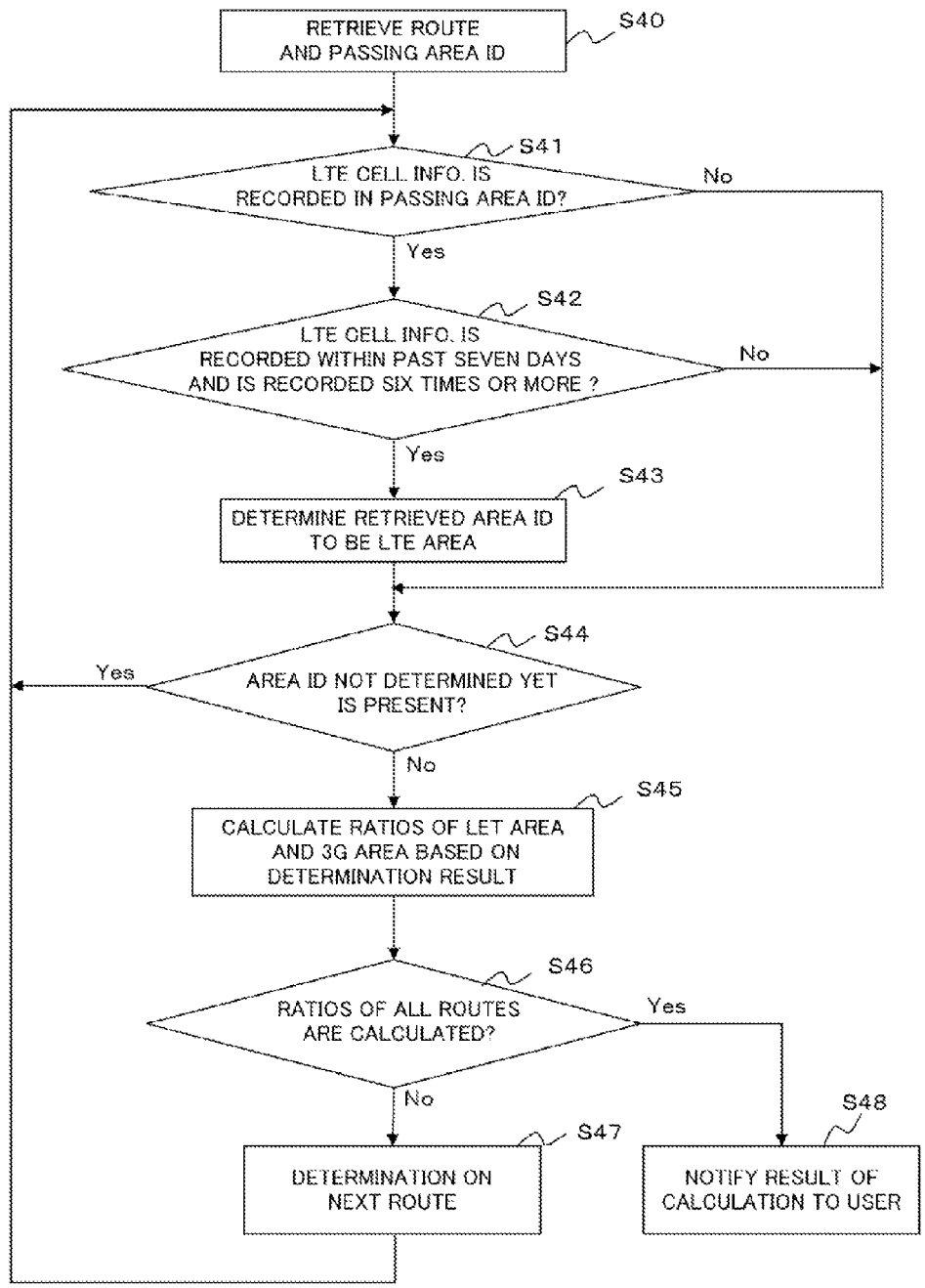
FIG. 16 is a flow diagram illustrating an example of operation of a controller.

As illustrated in the example of FIG. 16, the controller 22 retrieves at least one route that connects a departing position and an arrival position on the basis of the route retrieval information. In addition, the controller 22 may retrieve time and cost that are taken to move along the route. Then, on the basis of the table of the mesh DB 23 generated in the above manner, the controller 22 retrieves at least one area ID associated with the area through which the retrieved route passes (step S40).

Next, the controller 22 determines whether one of the area IDs retrieved in step S40 has a record of LTE cell information (step S41).

If the result of the determination in step S41 is positive (Yes route in step S41), the controller 22 determines whether the LTE cell information is recorded within past seven days and is recorded six times or more (step S42). The condition of the determination in step S42 is a merely example, and can apply other values, needless to say.

If determining that the condition of step S42 is satisfied (Yes route in step S42), the controller 22 that determines the area corresponding to the area ID is an LTE area (step S43).

In succession, the controller 22 determines whether an area ID that does not undergo the determination of steps S41-S43 is present among the area IDs retrieved in step S40 (step S44). Likewise, if the result of determination of step S41 or step S42 is negative (No routes in steps S41 and S42), the controller 22 determines whether an area ID not undergoing the determination is present (step S44).

If determining that an area ID not undergoing the determination is present (Yes route in step S44), the controller 22 repeats the procedure of steps S41-S43 on the area ID not undergoing the determination.

On the other hand, if determining that an area ID not undergoing the determination is not present (No route in step S44), the controller 22 calculates ratios of LTE areas and 3G areas on the retrieved route (step S45).

Then, the controller 22 determines whether the above ratios are calculated for all the routes retrieved in step S40 (step S46). If the ratios of all the routes are not calculated yet (No route step S46), the controller 22 carries out the procedure of steps S41-S45 on another route (i.e. a route not undergoing the calculation in step S45) (step S47).

Conversely, if the above ratios are calculated for all the routes retrieved in step S40 (Yes route in step S46), the controller 22 attaches the result of the calculation in step S45 to the information related to the routes retrieved in step S40, and notifies the information including the result of the calculation to the mobile user terminal 7 (step S48).

Throughout the above procedure, the controller 22 can retrieve, as exemplarily depicted in FIG. 17, two routes of; a first route from A station through C station finally to D station; and a second route from A station through B station finally to D station. On the basis of the information related to the retrieved routes and the map data in the mesh DB 23, the controller 22 can further detect that areas that the first route passes have area IDs "b2", "b3", "b4", "c4", and "d4", and that the areas that the second route passes have area IDs "b2", "c2", "c3", and "d4".

Then, as exemplarily depicted in FIG. 18, the controller 22 detects the status of registering LTE cell information of the area IDs that the first and second routes pass in the table of the mesh DB 23, and ratios of the LTE areas and of the 3G areas on each of the first and second routes. In this example, the first route has 100% of LTE areas and 0% 3G areas; and the second route has 50% of LTE areas and 50% of 3G areas. Thereby, various pieces of information of FIG. 19 can be obtained.

The various pieces of information of FIG. 19 are notified from the IF 21 to the user of the mobile user terminal 7.

Figure 20:
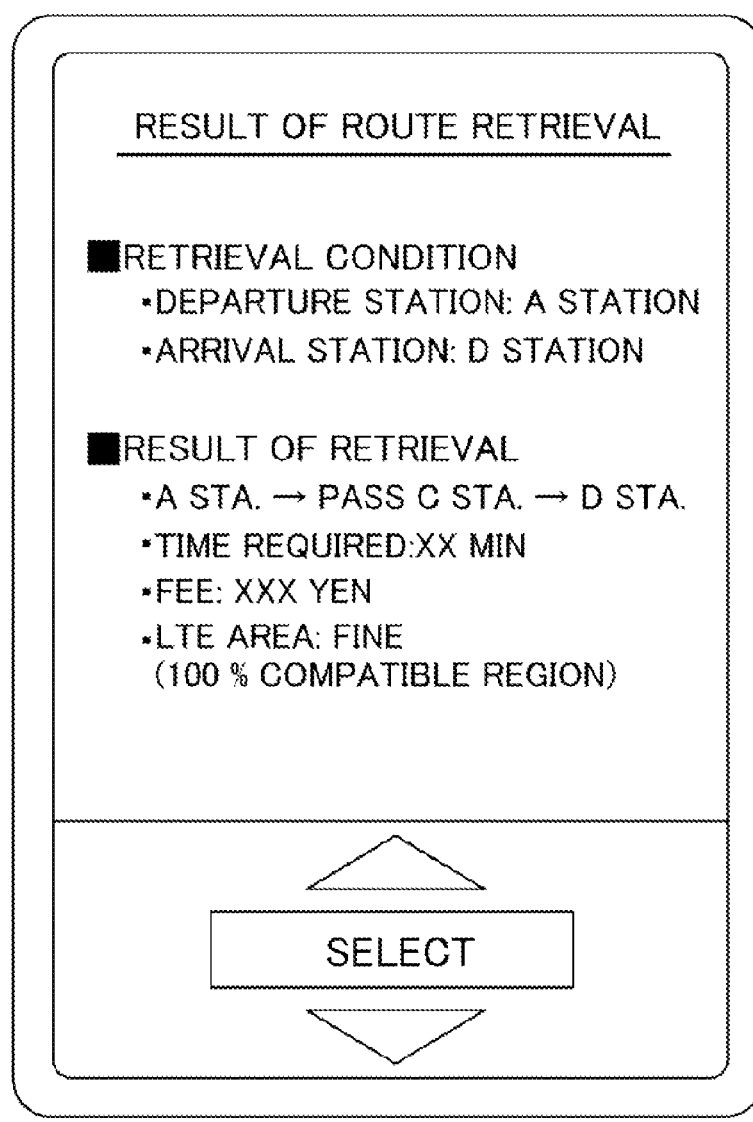
FIG. 20 is a diagram illustrating an example of displayed information on a mobile terminal.

FIG. 20 is an example of a display screen of the mobile user terminal 7 when receiving the above notification. As illustrated in FIG. 20, the communication controller 2 may control the mobile user terminal 7 such that a route having a larger ratio of LTE areas is preferentially displayed. The communication environment, such as "fine", "normal", or "poor", based on a ratio of LTE areas may be displayed.

As the above, this function can notify the user of information of areas put into LTE areas in the form of being attached to the result of retrieval of routes requested by the user, so that convenience to users can be enhanced. In addition, combining information related to communication areas and service to be provided to a user makes it possible to invite the users to LTE areas and to promote use the LTE.

Although the above example assumes that the controller 22 has the function of retrieving routes, the function may be provided by the access/mobility service system 6. In this case, the controller 22 can omit the function, and may satisfactorily calculate ratios of LET areas and 3G areas on each route on the basis of information about the routes which information is provided from the access/mobility service system 6 and notify the ratios to the user.

(1.3.4) Function (d) of Detecting an Area being Promoted to be an LTE Area and Notifying the Detected Area to the Station Establishment Planning System 5

The communication controller 2 can receive LTE area setting information exemplarily depicted in FIG. 21 at the IF 25 from the station establishment planning system 5. The station establishment planning system 5 may include, for example, area designing system and a base station parameter setting tool.

The LTE area setting information includes, for example, retrieval area information indicating an area that the station establishment planning system 5 wishes to put into an LTE area and an analysis interval indicating whether an area promoted to be put into an LTE area is detected and notified regularly or occasionally. In the example of FIG. 21, area IDs "a1", "a2", "a3", and "a4" are set to be the retrieval areas, and timings of detecting an area to be put into an LTE area and of notifying the detected area are set to be occasionally in response to a request from the station establishment planning system 5.

Here, the operation of the controller 22 will now be described with reference to FIG. 22.

Figure 22:
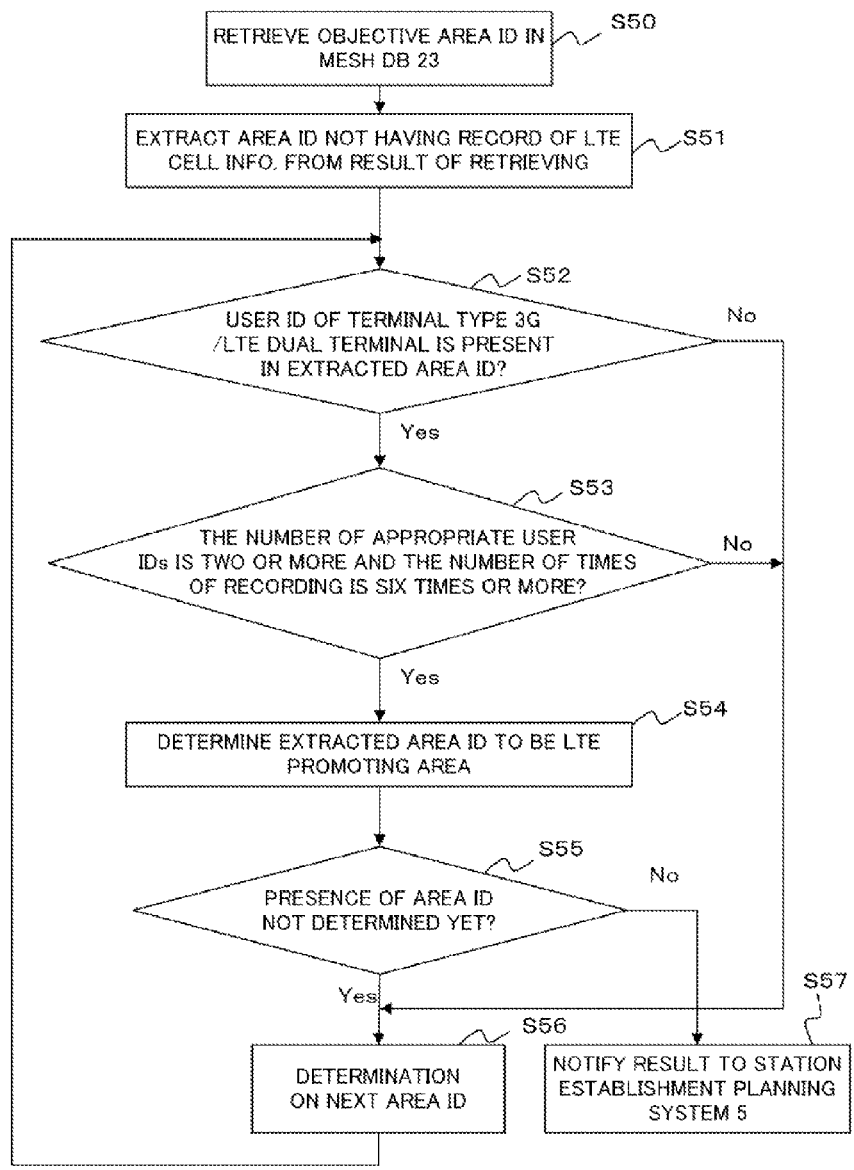
FIG. 22 is a flow diagram illustrating an example of operation of a controller.

As exemplarily depicted in FIG. 22, the controller 22 retrieves area ID set to be the retrieval area information in the above LTE area setting information from the table of the mesh DB 23 created in the above manner (step S50).

Next, the controller 22 extracts an area ID having no record of LTE cell information from the area IDs retrieved in step S50 (step S51).

Then, the controller 22 determines whether a user ID having terminal type information of "LTE/3G dual terminal" is present in one of the area IDs extracted in step S51 (step S52).

If the result of the determination in step S52 is positive (Yes route in step S52), the controller 22 determines whether the number of user IDs having terminal type information of "LTE/3G dual" terminal is two or more and 3G user information of each of user IDs are recorded six times or more (step S53). The condition of the determination in step S53 is a merely example, and can apply other values, needless to say.

Thereby, the controller 22 detects an incommunicable area that is incapable of communication by using LTE, and on the basis of the terminal type information of the mobile user terminal 7, can detect the distribution of terminal types of the mobile terminals 7 for each incommunicable area. Furthermore, on the basis of the detected distribution of terminal types and the contents of the terminal type DB 24, the controller 22 can detect the distribution of a communication function for each incommunicable area.

If determining that the condition of step S53 is satisfied (Yes route in step S53), the controller 22 determines the area associated with the area ID to be put into an LTE area (step S54).

After that, the controller 22 determines whether an area ID that does not undergo the determination of steps S52-S54 is present among the area IDs extracted in step S51 (step S55).

If determining that an area ID not undergoing the determination is present (Yes route in step S55), the controller 22 repeats the procedure of steps S52-S54 on the corresponding area ID not undergoing the determination (step S56). Even if the results of the determination of steps S52 and S53 are negative (No routes in steps S52 and S53), the controller 22 repeats the procedure of steps S52-S54 (step S56).

On the other hand, if determining that an area ID not undergoing the determination is not present (No route in step S55), the controller 22 notifies the result of the detection in step S54 to the station establishment planning system 5 (step S57).

Throughout the above procedure, the controller 22 can detect, as exemplarily depicted in FIG. 23, the distribution of terminal types of mobile terminals 7 in each of the areas having area IDs "a1" through "a4" that the station establishment planning system 5 wishes to put into LTE areas.

The controller 22 can notify, in the exemplary format of FIG. 24, the areas "a1" and "a2" accommodating more mobile terminals 7 having a communication function compatible with LTE as areas to be promoted into LTE areas among the areas having area IDs "a1" through "a4" that the station establishment planning system 5 wishes to put into LTE areas to the station establishment planning system 5.

As the above, this function can notify an area accommodating a larger number of mobile terminals 7 having a LTE communication function as an area to be promoted into an LTE area among areas not put into LTE areas yet to the station establishment planning system 5, so that it is possible to support the station establishment planning system 5 to efficiently establish (arrange) base stations.

(1.3.5) Function (e) of Detecting Whether an Area is Correctly Put into an LTE Area and Notifying the Result of the Detecting to the Station Establishment Planning System 5

The communication controller 2 can receive, at the IF 25, LTE area confirmation setting information exemplarily depicted in FIG. 25 from the station establishment planning system 5.

The LTE area confirmation setting information includes, for example, station retrieval area information indicating an area ID that the station establishment planning system 5 has put into an LTE area through arranging an eNB 33 but wishes to confirm the normality of the LTE area; and analysis interval indicating the timings of the confirmation of the LTE area and notification of the result of the confirmation is carried out regularly or occasionally. In the example of FIG. 25, area IDs "b1" and "b2" are set for the station retrieval area information, and the timings of the confirmation of the LTE area and notification of the result of the confirmation are set to be occasionally in response to a request from the station establishment planning system 5.

Here, the operation of the controller 22 will now be described with reference to FIG. 26.

Figure 26:
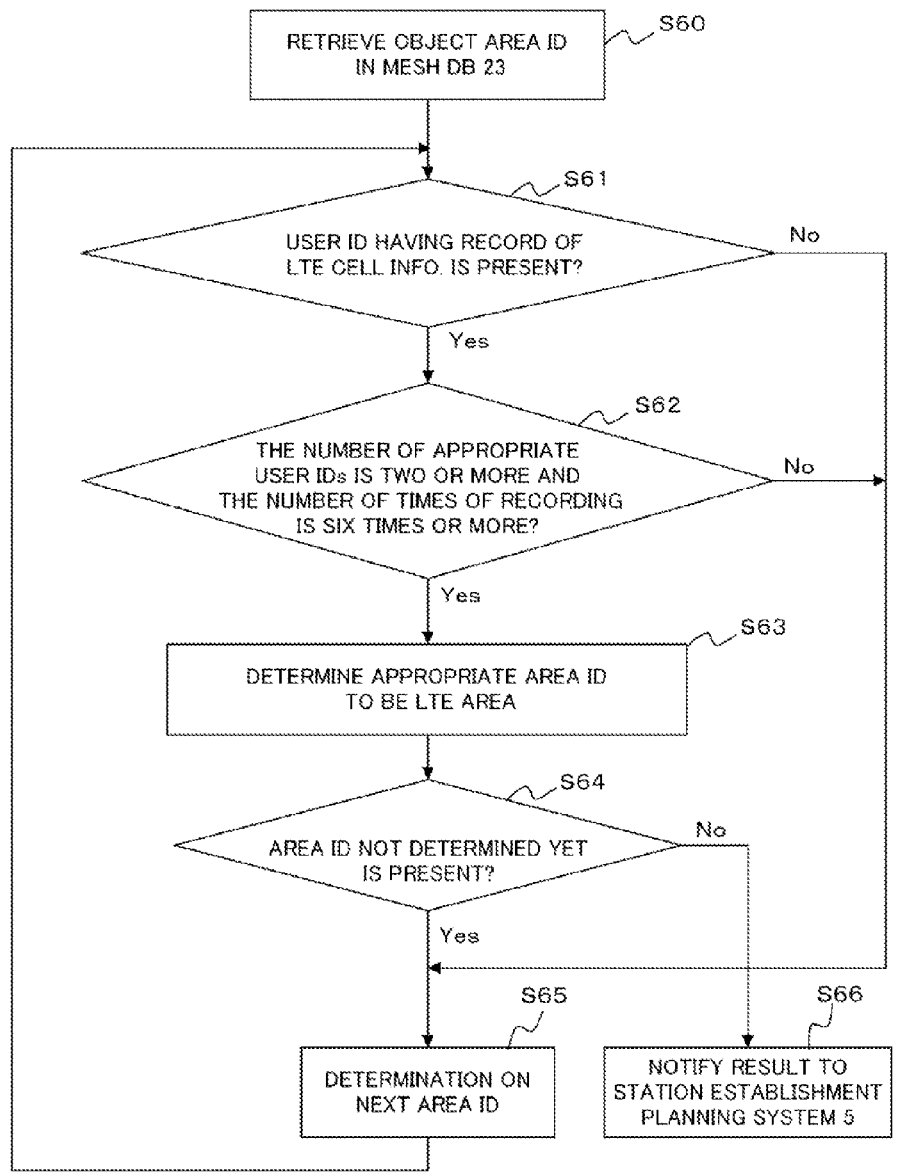
FIG. 26 is a flow diagram illustrating an example of operation of a controller.

As illustrated in the example of FIG. 26, the controller 22 retrieves an area ID set in the LTE area confirmation setting information from the table in the mesh DB 23 generated in the above manner (step S60).

Next, the controller 22 determines whether one of the area IDs retrieved in step S60 has a record of the LTE cell information (step S61).

If the result of the determination in step S61 is positive (Yes route in step S61), the controller 22 determines whether the number of appropriate user IDs in the area ID is two or more and the number of times of recording LTE of each of the same IDs is six or more (step S62). The condition of the determination in step S62 is a merely example, and can apply other values, needless to say.

If the result of the determination in step S62 is positive (Yes route in step S62), the controller 22 determines the area associated with the area ID to be an area confirmed to be put into an LTE area (step S63).

After that, the controller 22 determines whether an area ID that does not undergo the determination of steps S61-S63 is present among the area IDs extracted in step S60 (step S64).

If determining that an area ID not undergoing the determination is present (Yes route in step S64), the controller 22 repeats the procedure of steps S61-S63 on the corresponding area ID not undergoing the determination (step S65). Even if the results of the determination of steps S61 and S62 are negative (No routes in steps S61 and S62), the controller 22 repeats the procedure of steps S61-S63 (step S65).

On the other hand, if determining that an area ID not undergoing the determination is not present (No route in step S64), the controller 22 notifies the result of the detection in step S63 to the station establishment planning system 5 (step S66).

Throughout the above procedure, the controller 22 can detect, as exemplarily depicted in FIG. 27, the state of LTE in the areas associated with the area IDs "b1" and "b2" that station establishment planning system 5 wishes to confirm to be put into LTE areas.

Specifically, in relation to the areas associated with the area IDs "b1" and "b2" that station establishment planning system 5 wishes to confirm to be put into LTE areas, the controller 22 can notify, in the format exemplified by that of FIG. 28, the area ID "b1" confirmed to be put into an LTE area to the station establishment planning system 5.

As the above, this function can confirm whether an area is put into an LTE area and notify the result of the confirmation to the station establishment planning system 5, so that it is possible to support the station establishment planning system 5 to efficiently establish base stations.

(2) Examples of Hardware Configurations

Figure 29:
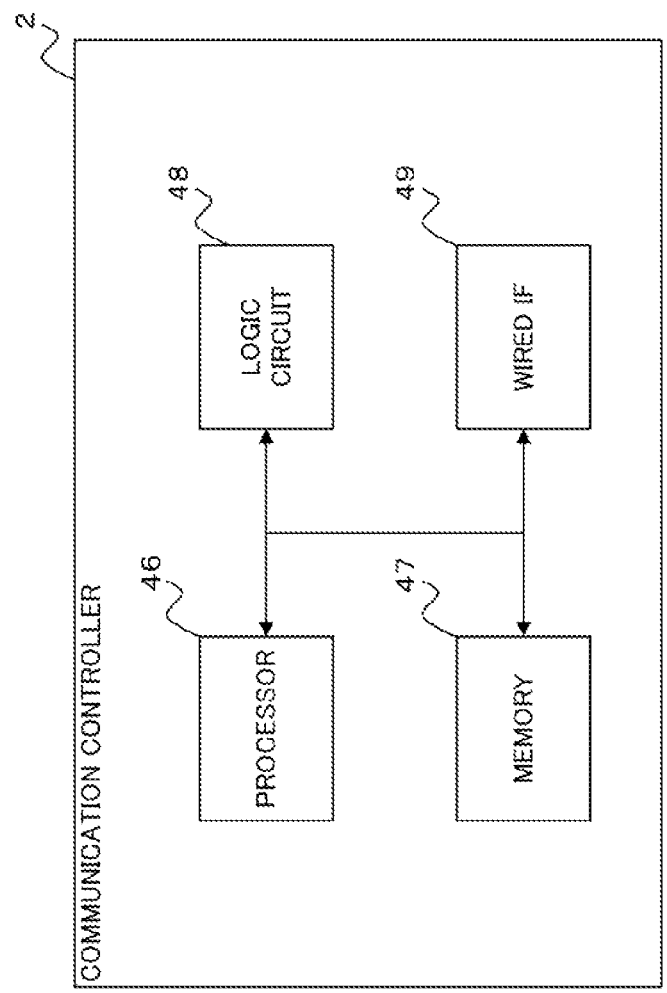
FIG. 29 is a diagram illustrating an example of the hardware configuration of a communication controller.

Here, FIG. 29 illustrates an example of the hardware configuration of the communication controller 2.

A processor 46 is a device that processes data, and includes, for example, a Central Processing Unit (CPU) or a Digital Signal Processor (DSP). A memory 47 is a device that stores (holds) data, and includes, for example, a Read Only Memory (ROM) or a Random Access Memory (RAM). A logic circuit 48 is an electronic circuit that calculates various logical operations, and includes, for example, a Large Scale Integration (LSI) and a Field-Programmable Gate Array (FPGA). A wired IF 49 is an interfacing device that carries out wired communication with a wireless base station, such as an eNB 33 and/or a BTS 44, connected to a network (i.e., backhaul network) of the net of a mobile telephone system, and with an external system.

For example, the elements of the communication controller 2 of FIG. 29 correspond to the elements of the communication controller 2 of FIG. 2 as follows.

For example, the processor 46 corresponds to the controller 22; the memory 47 corresponds to the mesh DB 23; the logic circuit 48 corresponds to the terminal type DB 24; and the wired IF 49 corresponds to the IF 21 and the IF 25.

FIG. 30 illustrates an example of the hardware configuration of the mobile user terminal 7.

A wireless IF 50 is an interfacing device that carries out wireless communication with the eNB 33 and/or the BTS 44. A processor 51 is a device that processes data, and includes, for example, a CPU or a DSP. A memory 52 is a device that stores data, and includes, for example, a ROM or RAM. A logic circuit 53 is an electronic circuit that calculates various logical operations, and includes, for example, an LSI and an FPGA. An input IF 54 is an inputting device and includes, for example, an operating button and a microphone. An output IF 55 is an outputting device and includes, for example, a monitor display and a speaker.

Here, the wireless IF 50 functions as an example of a transmitter that sends the positioning information of the mobile station 7 itself, and also functions as an example of a receiver that receives information of a communicable area that allows communication by using at least one wireless communication scheme detected on the basis of determination of whether the sent positioning information indicates which area among a number of areas.

The wireless IF 50, the processor 51, and the logic circuit 53 cooperatively function as an example of a detector that detects the positioning information of the mobile user terminal 7 itself and concurrently, the wireless IF 50 solely functions as an example of a transmitter that transmits the detected positioning information that is to be user for detecting a communicable area that allows communication by using at least one wireless communication scheme.

In this case, the wireless IF 50 may transmit the detected positioning information to the communication controller 2 using a transmitting timing, a transmission channel, and a transmitting power different from those for wireless quality information detected separately and the user information.

The processor 51 and the logic circuit 53 cooperatively function as an example of a determiner that determines whether an area is communicable through at least one wireless communication scheme such as LTE.

Also in this case, the wireless IF 50 functions as an example of a transmitter that transmits the result of the determination on the communicability and the positioning information of the mobile user terminal 7 itself in association with each other. If the mobile user terminal 7 is capable of communication through another communication scheme, the wireless IF 50 may transmit the result of the determination on the communicability and the positioning information of the mobile user terminal 7 itself in association with each other through the other wireless communication scheme. For example, if the mobile user terminal 7 is communicable by using at least one wireless communication scheme such as LTE, the wireless IF 50 may transmit the result of the determination on the communicability and the positioning information of the mobile user terminal 7 itself in association with each other through the wireless communication scheme such as LTE.

If the area is incommunicable through at least one wireless communication scheme such as LTE, the memory 52 may hold the result of the determination on the communicability and the positioning information of the mobile user terminal 7 itself in association with each other.

In this case, when the area comes to be communicable through at least one wireless communication scheme such as LTE, the wireless IF 50 may transmit the result of the determination on the communicability and the positioning information of the mobile user terminal 7 itself held in the memory 52 in association with each other.

Furthermore, FIG. 31 illustrates an example of the hardware configuration of a wireless base station exemplified by the eNB 33 or the BTS 44.

A wireless IF 60 is an interfacing device that carries out wireless communication with a mobile user terminal 7. A processor 61 is a device that processes data, and includes, for example, a CPU or a DSP. A memory 62 is a device that stores data, and includes, for example a ROM or RAM. A logic circuit 63 is an electronic circuit that calculates various logical operations, and includes, for example an LSI and an FPGA. A wired IF 64 is an interfacing device that carries out wired communication with another wireless base station connected to a network (i.e., backhaul network) of the net of a mobile telephone system.

Here, the wireless IF 60 functions as an example of a receiver that receives information of a communicable area that allows communication by using at least one wireless communication scheme detected on the basis of determination of whether positioning information indicating which area includes the positioning of the mobile user terminal 7 among a number of areas, the information being transmitted from the mobile user terminal 7, and concurrently functions as an example of a transmitter that transmits information related to the communicable area notified by the received information to the mobile user terminal 7.

(3) Others

The elements and the functions of the communication controller 2, the mobile user terminal 7, and the wireless base station 33 and 44 may be omitted or combined according to the requirement. Namely, the respective configurations and the respective functions may be omitted or combined as long as the above effect of the present invention is ensured.

For example, in the above description, an area is detected using various pieces of information included in user information sent from at least one mobile user terminal 7. However, a lager number of mobile terminals 7 make it possible to more efficiently and more widely detect areas.

The elements and the functions of the communication controller 2 may be concentrated in one of or distributed over the E-SMLC 31, the MME 32, the eNB 33, the SMLC 41, the MSC 42, the RNC 43, and the BTS 44. In this case, the wireless communication system 1 can omit the communication controller 2.

In the above first embodiment, the LTE areas 34 and the 3G areas 45 are included in the wireless communication system 1. However, the same communication control can be applied even when the wireless communication system 1 includes only the LTE areas 34 due to development in the LTE areas 34.

In the above first embodiment, the communication controller 2 stores LTE cell information and 3G cell information included in user information sent from the mobile terminals 7 into the mesh DB 23, but alternatively the communication controller 2 may select one of LTE cell information and 3G cell information included as the wireless quality information included in the user information according to the requirement and store the selected information into the table of the mesh DB 23. For example, if the communication controller 2 wishes to detect only the LTE areas 34, it is sufficient that the communication controller 2 selectively stores LTE cell information as the wireless quality information included in the user information into the table of the mesh DB 23, so that the resource consumption can be saved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:
1. A communication apparatus comprising:
  a receiver that receives positioning information of a mobile user terminal from the mobile user terminal which is able to communicate by using at least one wireless communication scheme;
  a detector that detects one or more communicable areas that allow communication by using the at least one wireless communication scheme, by determining which area includes a position indicated by the positioning information among a plurality of areas; and
  a notifier that notifies a result of the detecting by the detector to the mobile user terminal, wherein the detector calculates a ratio of the communicable areas of a route defined by a plurality of positions designated by the mobile user terminal; and the notifier attaches the calculated ratio to route information related to the route and notifies the route information to which the ratio is attached to the mobile user terminal.

2. The communication apparatus according to claim 1, wherein the detector detects the one or more communicable areas by determining, based on the positioning information, which area block among a plurality of area blocks obtained by dividing a predetermined region includes the mobile user terminal.

3. The communication apparatus according to claim 1, wherein the detector detects the one or more communicable areas, by determining which area among a plurality of areas, each being smaller than a cell area, includes a position indicated by the positioning information which is measured by using a Global Positioning System (GPS).

4. The communication apparatus according to claim 1, wherein the detector detects, based on the positioning information, whether each of the determined communicable areas comes into a communication failure area that is temporarily incapable of communication by using the at least one wireless communication scheme.

5. The communication apparatus according to claim 1, wherein the notifier notifies the result of the detecting by the detector to the mobile user terminal which has transmitted the positioning information to the communication apparatus by using the at least one wireless communication scheme from any one of the detected communicable areas while does not notifies the result of the detecting to another mobile user terminal which has not transmitted the positioning information to the communication apparatus by using the at least one wireless communication scheme from any one of the detected communicable areas.

6. The communication apparatus according to claim 1, wherein the detector detects, based on the positioning information, whether each of the determined communicable areas comes into an incommunicable area that is incapable of communication by using the at least one wireless communication scheme, and detects, based on identification information that identifies a communication function of the mobile user terminal, a distribution of the communication function of the mobile user terminal in the detected incommunicable area.

7. A method for communication comprising:
receiving positioning information of a mobile user terminal, which is able to communicate by using at least one wireless communication scheme, from the mobile user terminal;
detecting one or more communicable areas that allow communication by using at least one wireless communication scheme, by determining which area includes a position indicated by the positioning information among a plurality of areas; and
notifying the mobile user terminal of a result of the detecting, wherein
the detecting comprises calculating a ratio of the communicable areas of a route defined by a plurality of positions designated by the mobile user terminal; and
the notifying comprises attaching the calculated ratio to route information related to the route and notifying the mobile user terminal of the route information to which the ratio is attached.

8. A wireless communication system comprising:
a mobile user terminal which is able to communicate by using at least one wireless communication scheme; and a communication controller that receives positioning information of the mobile user terminal from the mobile user terminal, detects one or more communicable areas that allow communication by using the at least one wireless communication scheme, by determining which area includes a position indicated by the positioning information among a plurality of areas, and notifies the mobile user terminal of a result of the detecting, wherein the communication controller;
calculates a ratio of the communicable areas of a route defined by a plurality of positions designated by the mobile user terminal;
attaches the calculated ratio to route information related to the route; and
notifies the mobile user terminal of the route information to which the ratio is attached.

9. A mobile user terminal which is able to communicate by using at least one wireless communication scheme, comprising:
a transmitter that transmits positioning information of the mobile user terminal; and
a receiver that receives information of one or more communicable areas that allow communication by using the at least one wireless communication scheme, the areas being detected by determining which area includes a position indicated by the positioning information among a plurality of areas, wherein
the information including route information related to a route defined by a plurality of positions designated by the mobile user terminal, the route information including a ratio of the communicable areas of the route.

10. A mobile user terminal which is able to communicate by using at least one wireless communication scheme, comprising:
a determiner that determines whether the mobile user terminal is communicable by using the at least one wireless communication scheme at a current position of the mobile user terminal;
a transmitter that transmits a result of the determining by the determiner and positioning information of the mobile user terminal in association with each other; and
a receiver that receives route information related to a route defined by a plurality of positions designated by the mobile user terminal, the route information including a ratio of one or more communicable areas of the route, the communicable areas allowing communication by using the at least one wireless communication scheme.

11. The mobile user terminal according to claim 10, wherein
if the mobile user terminal is communicable with another wireless communication scheme at a current position of the mobile user terminal, the transmitter transmits the result of the determining by the determiner and the positioning information of the mobile user terminal in association with each other by using the another wireless communication scheme.

12. The mobile user terminal according to claim 10, wherein
if the mobile user terminal is communicable with the at least one wireless communication scheme at a current position of the mobile user terminal, the transmitter transmits the result of the determining by the determiner and the positioning information of the mobile user terminal in association with each other by using the at least one wireless communication scheme.

13. The mobile user terminal according to claim 10, further comprising:

a memory that stores, if the determiner determines that the mobile user terminal is incommunicable by using at least one wireless communication scheme at a current position of the mobile user terminal, the result of the determining by the determiner and the positioning information of the mobile user terminal in association with each other; and wherein, if the mobile user terminal comes to be communicable by using the at least one wireless communication scheme, the transmitter transmits the result of the determining by the determiner and the positioning information of the mobile user terminal that are stored in the memory in association with each other.

* * * * *